US011829763B2

(12) United States Patent
Chou et al.

(10) Patent No.: US 11,829,763 B2
(45) Date of Patent: Nov. 28, 2023

(54) EARLY LOAD EXECUTION VIA CONSTANT ADDRESS AND STRIDE PREDICTION

(71) Applicant: Apple Inc., Cupertino, CA (US)

(72) Inventors: Yuan C. Chou, Los Gatos, CA (US);
Viney Gautam, San Jose, CA (US);
Wei-Han Lien, Los Gatos, CA (US);
Kulin N. Kothari, Cupertino, CA (US);
Mridul Agarwal, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 115 days.

(21) Appl. No.: 16/539,684

(22) Filed: Aug. 13, 2019

(65) Prior Publication Data

US 2021/0049015 A1 Feb. 18, 2021

(51) Int. Cl.
*G06F 9/345* (2018.01)
*G06F 9/38* (2018.01)
*G06F 9/30* (2018.01)
*G06F 9/50* (2006.01)
*G06F 12/0802* (2016.01)

(52) U.S. Cl.
CPC ........ *G06F 9/3455* (2013.01); *G06F 9/30043* (2013.01); *G06F 9/3861* (2013.01); *G06F 9/5005* (2013.01); *G06F 12/0802* (2013.01)

(58) Field of Classification Search
CPC .. G06F 9/3806; G06F 12/0862; G06F 9/3861; G06F 2212/6026; G06F 12/0802; G06F 9/30043; G06F 9/3455; G06F 9/5005
USPC .......... 711/E12.057, E12.001, 137, 204, 213
See application file for complete search history.

(56) References Cited

U.S. PATENT DOCUMENTS

| | | | |
|---|---|---|---|
| 6,438,673 B1 | 8/2002 | Jourdan et al. | |
| 6,976,147 B1* | 12/2005 | Isaac | G06F 12/0862 711/205 |
| 7,856,548 B1* | 12/2010 | Nelson | G06F 9/3832 712/225 |
| 10,437,718 B1* | 10/2019 | Anghel | G06N 20/00 |
| 2012/0066455 A1* | 3/2012 | Punyamurtula | G06F 12/0862 711/204 |
| 2015/0089186 A1* | 3/2015 | Kim | G06F 9/3842 711/213 |
| 2017/0139717 A1* | 5/2017 | Hornung | G06F 9/3806 |
| 2017/0286119 A1 | 10/2017 | Al Sheikh et al. | |

(Continued)

*Primary Examiner* — Sanjiv Shah
*Assistant Examiner* — Edward Waddy, Jr.
(74) *Attorney, Agent, or Firm* — Robert C. Kowert; Kowert, Hood, Munyon, Rankin & Goetzel, P.C.

(57) ABSTRACT

A system and method for efficiently reducing the latency of load operations. In various embodiments, logic of a processor accesses a prediction table after fetching instructions. For a prediction table hit, the logic executes a load instruction with a retrieved predicted address from the prediction table. For a prediction table miss, when the logic determines the address of the load instruction and hits in a learning table, the logic updates a level of confidence indication to indicate a higher level of confidence when a stored address matches the determined address. When the logic determines the level of confidence indication stored in a given table entry of the learning table meets a threshold, the logic allocates, in the prediction table, information stored in the given entry. Therefore, the predicted address is available during the next lookup of the prediction table.

20 Claims, 12 Drawing Sheets

(56) References Cited

U.S. PATENT DOCUMENTS

| | | | |
|---|---|---|---|
| 2018/0276046 A1* | 9/2018 | Joao | G06F 9/4881 |
| 2019/0310845 A1* | 10/2019 | Ramani | G06F 9/3834 |
| 2020/0150968 A1* | 5/2020 | Fatehi | G06F 9/30058 |
| 2020/0201644 A1* | 6/2020 | Bandishte | G06F 9/3806 |
| 2020/0242037 A1* | 7/2020 | Navon | G06F 12/0862 |

* cited by examiner

EARLY LOAD EXECUTION VIA CONSTANT ADDRESS AND STRIDE PREDICTION

BACKGROUND

Technical Field

Embodiments described herein relate to the field of computing systems and, more particularly, to efficiently reducing the latency of load operations.

Description of the Related Art

Microprocessors typically include overlapping pipeline stages and out-of-order execution of instructions. Additionally, several microprocessors support simultaneous multi-threading to increase throughput. These techniques take advantage of instruction level parallelism (ILP) in source code. However, data dependencies reduce maximum throughput of the microprocessors. A data dependency occurs when an operand of an instruction depends on a result of an older instruction in program order. Data dependencies appear either between operands of instructions in a sequential code segment or between operands of instructions belonging to subsequent loop iterations. In sequential code, one or more of read after write (RAW), write after read (WAR) or write after write (WAW) dependencies may be encountered.

Register renaming is used to allow parallel execution of instructions despite the WAR and WAW dependencies. However, the true dependency, or RAW dependency, is still intact. Therefore, architectural registers repeatedly used as a destination register and subsequently as a source register cause serialization of instruction execution for associated source code segments. One example of a common RAW dependency with an architectural register is a load instruction, or a read operation, attempting to read a memory location that has been modified by an older (in program order) store instruction. This older instruction may not have yet committed its results to the memory location. This type of RAW dependency may occur frequently during program execution. Reading the memory location may include an appreciable latency and reduce processor throughput. For many software applications, load instructions are at the beginning of dependency chains in the code, which further adds latency and reduces throughput.

In view of the above, efficient methods and mechanisms for efficiently reducing the latency of load operations are desired.

SUMMARY

Systems and methods for efficiently reducing the latency of load operations are contemplated. In various embodiments, a processor includes a prediction table with each table entry storing identification of a load instruction and a predicted address corresponding to the load instruction. In some embodiments, logic of the processor fetches one or more instructions and accesses the prediction table with program counters of instructions or hash values generated from information corresponding to instructions. If the logic determines a hit occurs in the prediction table, a predicted load address is retrieved from the prediction table. The logic accesses a cache with the predicted load address, and when a cache hit occurs, the logic retrieves data from the cache stored in a memory location pointed to by the predicted address. The logic also stores the data in a destination register of the load instruction as well as forwards the data to any younger instructions dependent on the load instruction.

The processor also includes a learning table with each table entry storing at least a level of confidence indication specifying a level of confidence that the predicted address is correct for a corresponding load instruction. In some embodiments, this level of confidence indication is a count. In other embodiments, this level of confidence indication is a mapped value or any other value used to specify a level of confidence that the predicted address is correct for a corresponding load instruction. When the logic determines the predicted address matches a verified address for the load instruction, the logic updates the level of confidence indication to indicate a higher level of confidence. In some embodiments, prior to comparing with the verified address to determine whether there is a match, the logic sums a base address and a predicted stride to determine the predicted address.

When the logic determines the level of confidence indication stored in a table entry of the learning table meets a threshold, the logic selects the predicted address stored in the table entry of the learning table for use as a predicted address on a subsequent execution of the load instruction. In an embodiment, logic determines that the level of confidence indication meets the threshold by determining the level of confidence indication equals or exceeds the threshold. In some embodiments, the level of confidence indication is measured by a saturating counter, and when logic determines the counter has saturated, the logic determines the level of confidence indication meets the threshold. In one embodiment, when the logic selects the predicted address stored in the table entry of the learning table for use as a predicted address on a subsequent execution of the load instruction, the logic allocates a table entry of the prediction table with information stored in the table entry of the learning table. The information includes at least the predicted address and an identification of the load instruction. Therefore, the predicted address is available during a later lookup of the prediction table for a subsequent execution of the load instruction. In an embodiment, the predicted address is stored as a sum of a base address and a predicted stride, whereas, in other embodiments, logic stores each of the base address and the predicted stride separate in the prediction table.

After verifying the address of the load instruction, when the logic determines the predicted address does not match the verified address for the load instruction, in some embodiments, the logic updates the level of confidence indication in a corresponding table entry of the learning table to indicate a lower level of confidence. Similarly, when the logic determines that the load instruction qualifies for store-to-load (STL) forwarding, the logic updates the level of confidence indication to indicate a lower level of confidence. In some embodiments, when the logic determines the level of confidence indication stored in table entry of the learning table falls below a lower threshold, the logic invalidates, in the predictor table, any information for a corresponding load instruction.

These and other embodiments will be further appreciated upon reference to the following description and drawings.

BRIEF DESCRIPTION OF THE DRAWINGS

The above and further advantages of the methods and mechanisms may be better understood by referring to the following description in conjunction with the accompanying drawings, in which.

Figure 1:
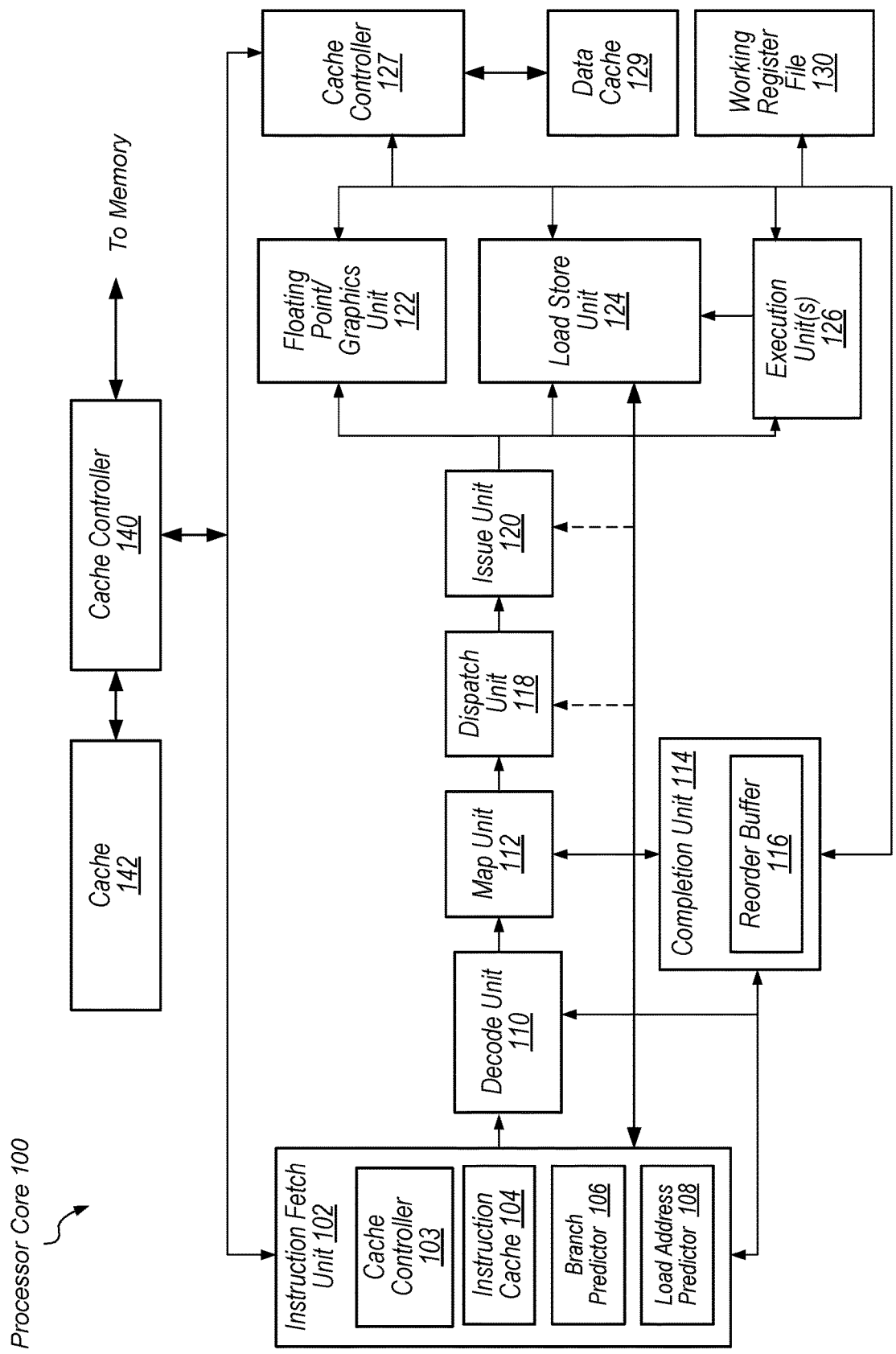
FIG. 1 is a block diagram of one embodiment of a processor core.

While the embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) for that unit/circuit/component.

DETAILED DESCRIPTION OF EMBODIMENTS

In the following description, numerous specific details are set forth to provide a thorough understanding of the embodiments described in this disclosure. However, one having ordinary skill in the art should recognize that the embodiments might be practiced without these specific details. In some instances, well-known circuits, structures, and techniques have not been shown in detail for ease of illustration and to avoid obscuring the description of the embodiments.

Turning now to FIG. 1, a block diagram illustrating one embodiment of a processor core 100 is shown. In various embodiments, the logic of processor core 100 is included in one or more cores of a central processing unit (CPU). Processor core 100 includes instruction fetch unit (IFU) 102. Fetched instructions are sent from the IFU 102 to decode unit 110, possibly a map unit 112, a dispatch unit 118, and issue unit 120. Issue unit 120 is coupled to issue instructions to any of a number of instruction execution resources including execution unit(s) 126, a load store unit (LSU) 124, and/or a floating-point/graphics unit (FGU) 122. The instruction execution resources 122-126 are coupled to a working register file 130. It is noted that the illustrated embodiment is merely one example of how processor core 100 is implemented. In other embodiments, processor core 100 includes other components and interfaces not shown in FIG. 1. Alternative configurations and variations are possible and contemplated.

As shown, the LSU 124 is coupled to the cache controller 127, which transfers messages, memory requests, and memory responses with data cache 126. The cache controller 103 within the IFU 102 transfers messages, memory requests, and memory responses with instruction cache 104, and similarly, the cache controller 140 transfers messages, memory requests, and memory responses with the cache 142. In various embodiments, the cache controllers 103, 127 and 140 include one or more miss queues. In some embodiments, the load address predictor 108 provides a predicted load request directly to the LSU 124 while skipping one or more of the decode unit 110, the map unit 112, the dispatch unit 118 and the issue unit 120. As used herein, a "memory access operation" is also referred to as a "memory access request" or a "memory request" or a "memory access instruction." As used herein, a "read request" is also referred to as a "load request" or a "load instruction" or a "load operation." Similarly, as used herein, a "write request" is also referred to as a "store request" or a "store instruction" or a "store operation."

The reorder buffer 116 is coupled to IFU 102, decode unit 110, working register file 130, and the outputs of any number of instruction execution resources for supporting out-of-order instruction execution. In an embodiment, each of the instruction cache 104 and the data cache 126 are level-one (L1) caches of a cache memory hierarchical subsystem. In such an embodiment, the cache 142, if present, is a level-two (L2) data cache and the cache controller 140 is a level-two (L2) cache controller. In some embodiments, the level-one (L1) caches 104 and 126 are at the highest level in the cache memory hierarchy and directly connected to the processor 100. As shown, the level-two (L2) cache 142 is one level lower from the L1 caches 104 and 126 in the cache memory hierarchy.

In various embodiments, the IFU 102 also includes the branch predictor 106 for predicting the outcome of branch instructions in order to remove control dependencies in the code. In various embodiments, the IFU 102 also includes a return address stack (not shown). IFU 102 also includes a number of data structures in addition to those shown such as an instruction translation lookaside buffer (ITLB), instruction buffers, and/or other structures configured to store state that is relevant to thread selection and processing (in multi-threaded embodiments of processor 100).

In some embodiments, the IFU 102 accesses a load address prediction table (or prediction table) after fetching instructions. In an embodiment, the IFU 102 accesses the prediction table with a program counter of an instruction prior to the instruction is decoded by the decode unit 110. In other embodiments, logic in the IFU 102 generates a hash value based on the program counter of an instruction. Using the hashing function, the logic combines one or more of a portion of the program counter or the entire program counter, a key or other selected value, a history pattern of correct load address predictions for the load instruction, and so forth. In some embodiments, the hashing function includes one of several examples of functions such as simply concatenating the bits, performing an exclusive OR of the bits, performing another Boolean arithmetic operation, or other. In other embodiments, the load address predictor 108 is accessed in a same or later pipeline stage as the decode unit 110, rather than in the IFU 102.

In various embodiments, IFU 102 uses the upper-level cache controller 103 to fetch instructions from upper-level instruction cache 104 and buffer them for downstream processing. The upper-level cache controller 103 also requests data from the lower-level cache 142 or memory through the lower-level cache controller 140 in response to instruction cache misses. The instructions that are fetched by IFU 102 in a particular clock cycle are referred to as a fetch group, with the fetch group including any number of instructions, depending on the embodiment. In one embodiment, decode unit 110 prepares fetched instructions for further processing such as by inspecting opcodes of the fetched instructions and determining register identifiers for source and destination operands.

Map unit 112 maps the decoded instructions (or uops) to physical registers within processor 100. The map unit 112 also implements register renaming to map source register addresses from the uops to the source operand numbers identifying the renamed source registers. Dispatch unit 118 dispatches uops to reservation stations (not shown) within the various execution units. Issue unit 120 sends instruction sources and data to the various execution units for picked (i.e., scheduled or dispatched) instructions. In one embodiment, issue unit 120 reads source operands from the appropriate source, which varies depending upon the state of the pipeline.

In the illustrated embodiment, processor core 100 includes a working register file 130 that stores instruction results (e.g., integer results, floating-point results, and/or condition signature results) that have not yet been committed to architectural state, and which serve as the source for certain operands. The various execution units also maintain architectural integer, floating-point, and condition signature state from which operands may be sourced. Instructions issued from issue unit 120 proceed to one or more of the illustrated execution units to be performed. In one embodiment, each of execution unit(s) 126 is similarly or identically configured to perform certain integer-type instructions defined in the implemented ISA, such as arithmetic, logical, and shift instructions. Floating-point/graphics unit (FGU) 122 performs and provide results for certain floating-point and graphics-oriented instructions defined in the implemented ISA.

Load store unit (LSU) 124 processes data memory references, such as integer and floating-point load and store instructions and other types of memory reference instructions. In an embodiment, LSU 124 interfaces with the upper-level cache controller 127 to access requested data stored in one of the data cache 126, the lower-level cache 142 (if available) and external memory. The upper-level cache controller 127 includes logic for detecting data cache misses and to responsively request data from the lower-level cache controller 140. The upper-level cache controller 103 and the lower-level cache controller 140 includes similar components and logic as upper-level cache controller 127.

Completion unit 114 includes reorder buffer (ROB) 116 and coordinates transfer of speculative results into the architectural state of processor 100. Entries in ROB 116 are allocated in program order. Completion unit 114 includes other elements for handling completion/retirement of instructions and/or storing history including register values, etc. In some embodiments, speculative results of instructions are stored in ROB 116 before being committed to the architectural state of processor 100, and confirmed results are committed in program order. Entries in ROB 116 are marked as completed when their results are allowed to be written to the architectural state. Completion unit 114 also coordinates instruction flushing and/or replaying of instructions.

Returning to the load address predictor 108, logic accesses the prediction table with one of a program counter, a concatenation of a program counter and a security tag, a hash value, or any other combination of values used to uniquely identify the load instruction. For a hit in the prediction table, the logic executes a load instruction with a retrieved predicted address from the prediction table. The processor core 100 processes both a predicted load request and a non-predicted load request. The non-predicted load request is used later to verify the predicted address of the predicted load request. For a prediction table miss, the logic processes only a non-predicted load request. For a predicted load request, the logic accesses the data cache 129 with the predicted load address, and when a cache hit occurs, the logic retrieves data from the data cache 129 stored in a memory location pointed to by the predicted address. The logic also stores the data in a destination register of the load instruction as well as forwards the data to any younger instructions dependent on the load instruction.

In various embodiments, the load address predictor 108 also includes a learning table with each table entry storing at least a level of confidence indication specifying a level of confidence that a predicted address is correct for a corresponding load instruction. In some embodiments, this level of confidence indication is a count. In other embodiments, this level of confidence indication is a mapped value or any other value used to specify a level of confidence that the predicted address is correct for a corresponding load instruction. When the logic determines the predicted address matches a calculated address for the non-predicted load request, the logic updates the level of confidence indication to indicate a higher level of confidence. In some embodiments, prior to comparing with the calculated address to determine whether there is a match, the logic sums a base address and a predicted stride, each stored in the learning table entry, to determine the predicted address.

When the logic determines the level of confidence indication stored in a table entry of the learning table meets a threshold, the logic selects the predicted address stored in the table entry of the learning table for use as a predicted address on a subsequent execution of the load instruction. In an embodiment, logic determines that the level of confidence indication meets the threshold by determining the level of confidence indication equals or exceeds the threshold. In some embodiments, the level of confidence indication is measured by a saturating counter, and when logic determines the counter has saturated, the logic determines the level of confidence indication meets the threshold. In some embodiments, when the logic selects the predicted address stored in the table entry of the learning table for use as a predicted address on a subsequent execution of the load instruction, the logic allocates a table entry of the prediction table for storing information currently stored in the table entry of the learning table. The information includes at least the predicted address and an identification of the load instruction. Therefore, the predicted address is available during the next lookup of the prediction table for a subsequent execution of the load instruction. In an embodiment, the predicted address is stored as a sum of a base address and a predicted stride, whereas, in other embodiments, logic stores each of the base address and the predicted stride separate in the prediction table.

After verifying the address of the load instruction, when the logic determines the predicted address of the predicted load request does not match the calculated address of the non-predicted load request, in some embodiments, the logic updates the level of confidence indication in a corresponding table entry of the learning table to indicate a lower level of confidence. Similarly, when the logic determines that the load instruction qualifies for store-to-load (STL) forwarding, the logic updates the level of confidence indication to indicate a lower level of confidence. In some embodiments, when the logic determines the level of confidence indication stored in table entry of the learning table falls below a lower threshold, the logic invalidates, in the predictor table, any information for a corresponding load instruction. It is noted that, in some embodiments, the logic of the load address predictor 108 is distributed throughout the processor core 100, rather than localized within the load address predictor 108. Similar to the logic of the processor core 100 used for other functionality, the logic for the load address predictor 108 is implemented in hardware such as circuitry, in software, such as firmware, or a combination of hardware and software.

Figure 2:
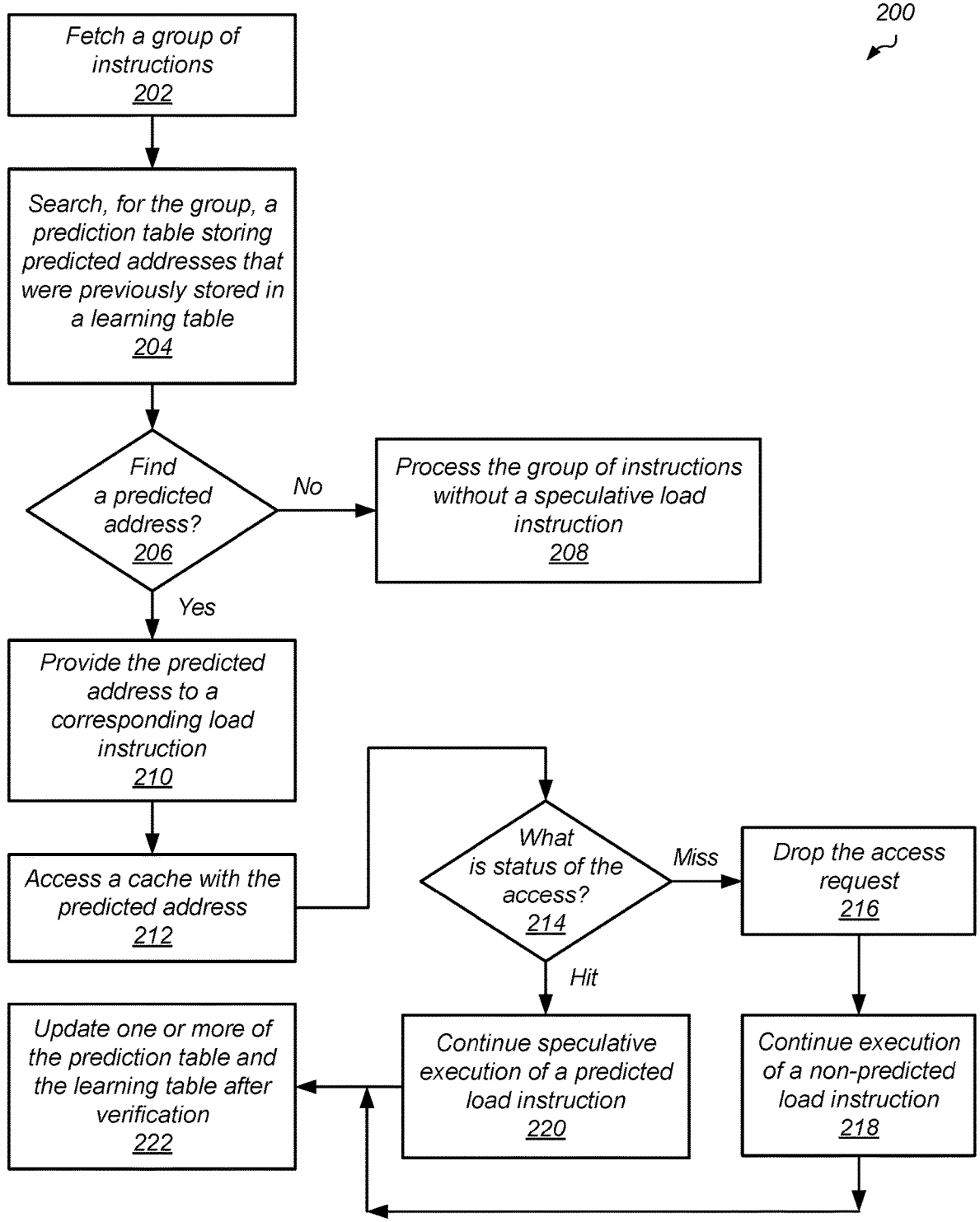
FIG. 2 is a flow diagram of one embodiment of a method for efficiently reducing the latency of load operations.

Turning now to FIG. 2, a generalized flow diagram of one embodiment of a method 200 for efficiently reducing the latency of load operations is shown. For purposes of discussion, the steps in this embodiment (as well as for FIGS. 5-9) are shown in sequential order. However, in other embodiments, some steps may occur in a different order than shown, some steps may be performed concurrently, some steps may be combined with other steps, and some steps may be absent.

Program instructions are processed by a processor. The instructions are loaded from system memory into one or more levels of caches of a cache memory hierarchy and compiled. In various embodiments, the processor fetches the compiled instructions from an instruction cache (block 202). Logic within the processor searches, for the group, a prediction table storing predicted addresses that were previously stored in a learning table (block 204). In various embodiments, entries of the learning table store at least an identification of a load address and a predicted address corresponding to the load instruction. In various embodiments, entries of the prediction table store a subset of the number of predicted addresses stored in the learning table. In an embodiment, each of the predicted addresses in the subset has a corresponding level of confidence indication that meets (e.g., equals or surpasses) a threshold. The level of confidence indication specifies a level of confidence that the predicted address is correct for a corresponding load instruction. In some embodiments, logic of the processor accesses the prediction table with one of a program counter, a concatenation of a program counter and a security tag, a hash value, or any other combination of values used to uniquely identify the load instruction.

If the logic does not find a predicted address for the group of fetched instructions ("no" branch of the conditional block 206), then the processor continues to process the instructions without a speculative load instruction (block 208). For example, the access of the prediction table results in a miss. In various embodiments, a pipelined core of the processor decodes the instructions, renames the source operand identifiers and the destination operand identifiers, determines dependencies among the instructions, and issues the instructions for execution. The pipelined core executes the instructions, forwards results to any dependent instructions, verifies correct operation of the instructions and commits the instructions. In various embodiments, the control flow of method 200 returns to block 202 to fetch another group of instructions before completing the processing of the current group of instructions.

In an embodiment, when the access of the prediction table results in a hit, the logic finds a predicated address for the group of fetched instructions. If the logic finds a predicted address for the group of fetched instructions ("yes" branch of the conditional block 206), then the processor provides the predicted address to a corresponding load instruction (block 210). In various embodiments, the predicted address is a virtual address. In other designs, the predicted address is a physical address translated from a virtual address during an earlier execution of the load instruction. In some embodiments, the logic provides other information regarding the predicted address such as a predicted stride.

Logic accesses a cache with the predicted address (block 212). In some embodiments, the load instruction with the predicted address traverses other pipeline stages before accessing the cache. For example, one or more of a decode, register renaming, dispatch and issue pipeline stages process the load instruction prior to accessing the cache. In other embodiments, the logic dispatches the load instruction after the address prediction and allocates an entry in an issue queue with information corresponding to the load instruction. This load instruction allocated in the issue queue is a speculative load instruction, whereas, a non-speculative version of the load instruction remains in an earlier pipeline stage. The non-speculative load instruction is used to verify the speculative load instruction at a later time when logic calculates an address for the non-speculative load instruction using values of its source operands.

In various embodiments, the issue queue issues the speculative load instruction to the load/store unit (LSU) when resources are ready, since the speculative load instruction is considered ready due to already having an address from the load address prediction logic. The speculative load instruction does not need to wait for an execution unit to resolve the address from source operands. In fact, in some embodiments, the load instruction is issued to the LSU prior to or during a same clock cycle as decoding logic or register renaming logic processes the speculative load instruction.

If the requested data is not found in the cache ("miss" branch of the conditional block 214), then, in some embodiments, logic of the processor drops the access request (block 216). For example, the logic does not forward a miss request to lower-level memory such as a lower-level cache of a cache memory hierarchy. In such a case, the logic cancels the speculative load instruction while the non-speculative load instruction continues execution (block 218). In other embodiments, the logic issues a miss request for the speculative load instruction and continues execution for the speculative load instruction. Afterward, logic of the processor updates one or more of the prediction table and the learning table after verification (block 222). For example, after the non-speculative load instruction completes, the logic accesses the learning table and compares the calculated address with the predicted address corresponding to the load instruction. In some embodiments, the logic updates one or more of the corresponding level of confidence indication, a count of consecutive mispredictions, a predicted stride, and so forth, based on the result of the verification.

If the requested data is found in the cache ("hit" branch of the conditional block 214), then logic of the processor continues speculative execution of the predicted load instruction (block 220). For example, the logic forwards the retrieved data to a destination register of the predicted load instruction and any dependent younger instructions while servicing the predicted load instruction (block 220). The logic continues to speculatively execute the younger, dependent instructions until the logic verifies whether the address prediction of the load instruction is correct. In addition, the logic of the processor continues to execute the non-predicted load instruction. The predicted load instruction with the predicted address does not receive the correct requested data when one of three conditions occur.

A first condition is the cache does not yet store a most-recent copy of the requested data. In some embodiments, the processor includes a store queue in the LSU for storing result data that has not yet been committed to the cache. The logic searches the store queue with the predicted address, and if the data is found, such as a hit occurs during a lookup with the predicted address, then the more-recent value of the requested data is stored in the store queue rather than stored in the cache. In such a case, the cache has a stale copy of the requested data, and the address prediction of the load instruction is marked as incorrect. The lookup of the cache for the load instruction is cancelled. If the lookup has already begun or has finished, the results are discarded. The logic marks the load instruction in a manner to retrieve result data from the store queue.

Similar to the first condition, a second condition occurs when the logic determines a zero cycle load (ZCL) condition is satisfied. For example, the source operands of the load instruction matches the source operands of an older store instruction with no intervening instructions between the store instruction and the load instruction modifying the source operands. Although the address of the store instruction is not yet resolved, the logic determines a memory dependence exists and marks the address prediction of the load instruction as incorrect. The lookup of the cache for the load instruction is cancelled. If the lookup has already begun or has finished, the results are discarded. The logic marks the load instruction in a manner to retrieve result data from the store queue.

A third condition occurs when the execution unit resolves the address for the load instruction using values of the source operands, and logic determines the resolved address does not match the predicted address. For each of the first condition, the second condition, and the third condition, if the lookup of the cache completed and logic forwarded the retrieved data to younger, dependent instructions, then the pipeline is flushed for the load instruction and the younger instructions. The instructions are replayed by refetching the instructions beginning with the load instruction. In addition, the load instruction is marked in load address prediction logic as not having a predicted address. In one embodiment, a corresponding entry in the prediction table is invalidated prior to the instructions are refetched. In addition, in block 222, as described earlier, one or more of the prediction table and the learning table have a corresponding entry updated. Therefore, during instruction replay, the conditional block 206 results in the "no" branch being taken for the load instruction. In some embodiments, if the lookup of the cache did not complete, or the logic did not yet forward the retrieved data to younger, dependent instructions, then the speculative load instruction is cancelled while the non-speculative load instruction continues and retrieves the requested data from the store queue.

Figure 3:
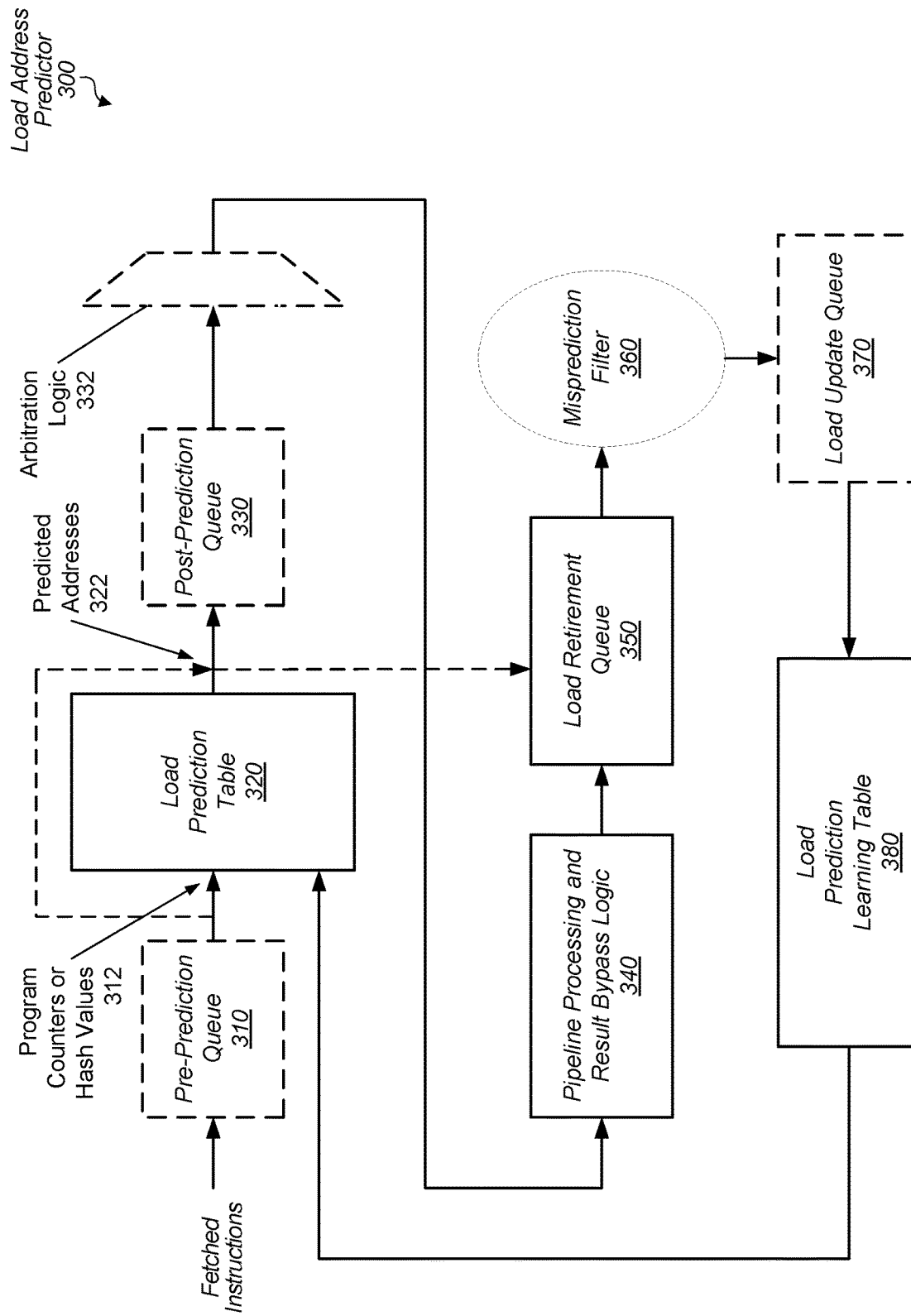
FIG. 3 is a block diagram of one embodiment of a load address predictor.

Referring to FIG. 3, a generalized block diagram illustrating an embodiment of a load address predictor 300 is shown. As shown, in various embodiments, the load address predictor 300 includes a load prediction table 320 (or prediction table 320) and a load address learning table 380 (or learning table 380). In various embodiments, the load execution pipeline and result bypass logic 340 includes pipeline stage of a processor core for processing instructions such as load instructions. The load retirement queue 350 manages the completion of load instructions. Logic accesses the prediction table 320 after fetching instructions. For a hit in the prediction table 320, the logic executes a load instruction with a retrieved predicted address from the prediction table 320. Therefore, the pipeline 340 processes both a predicted load request and a non-predicted load request.

For a predicted load request, if the logic determines the predicted address is incorrect, the pipeline 340 flushes the pipeline stages and intermediate registers of information for the load instruction and younger instructions. In addition, the logic invalidates the corresponding table entry in the prediction table 320. Further, the logic updates a level of confidence indication in the corresponding table entry of the learning table 380. The level of confidence indication specifies a level of confidence that the predicted address is correct for a corresponding load instruction. As described earlier, in some embodiments, this level of confidence indication is a count. In other embodiments, this level of confidence indication is a mapped value or any other value used to specify a level of confidence that the predicted address is correct for a corresponding load instruction. The logic updates the level of confidence indication to a value that indicates a lower level of confidence. For a non-predicted load request with no corresponding predicted load request, if the logic determines the calculated address matches a stored address in a corresponding table entry of the learning table 380, the logic updates the level of confidence indication to a value that indicates a higher level of confidence. When the level of confidence indication exceeds an upper threshold, the logic allocates, in the prediction table 320, information stored in the table entry of the learning table 380 corresponding to the load instruction. Therefore, the predicted address is available during the next lookup of the prediction table 320.

In some embodiments, the logic uses the pre-prediction queue 310 due to time constraints of the pipeline stages. Rather than immediately access the prediction table 320 for fetched instructions, the logic stores information corresponding to fetched instructions in the pre-prediction queue 310 (or queue 310). In some embodiments, the logic allocates entries in the queue 310 prior to decoding the instructions. In other embodiments, the logic allocates entries in the queue 310 after decoding the instructions. Some examples of the information stored in the queue entries of queue 310 after decoding are a portion or all of the program counter, a destination register identifier, a security tag, an instruction global number (GNUM), a hash value dependent upon at least the program counter, and so on.

In some embodiments, arbitration logic (not shown) selects which queue entries store candidate instructions for performing a lookup of the prediction table 320 in a next clock cycle. Logic assigns priorities to the queue entries based on a variety of factors such as one or more of a received quality-of-service (QoS) value, an application identifier, a process identifier, an age, an amount of data being requested by the load request, and so on. In some embodiments, weights corresponding to the factors are stored in programmable registers within the configuration and status registers (not shown). The logic determines a weights sum of the factors for determining priorities.

When a table hit occurs during access of the prediction table 320, in some embodiments, logic stores, in the post-prediction queue 330 (or queue 330), information stored in one or more of corresponding entries in the queue 310 and the prediction table 320. In some embodiments, the logic uses the post-prediction queue 330 due to time constraints of the pipeline stages. Similar to selecting entries of the queue 310, arbitration logic 332 selects entries of the queue 330 for sending information to the pipeline processing logic 340. The arbitration logic 340 selects queue entries of queue 330 based on a priorities set by weighted sums of one or more factors as described earlier.

The processing pipeline logic 340 includes one or more pipelines. If register renaming and dependency checking has not yet been performed, the processing pipeline logic 340 performs these steps. In addition, the processing pipeline logic 340 performs a lookup in a translation lookaside buffer (TLB) to perform virtual-to-physical address translations and obtain attributes corresponding to the requested data of the load instructions. After logic verifies permission checks for the load instructions, the processing pipeline logic 340 performs a lookup of the data cache using the retrieved physical address.

For a cache hit, the processing pipeline logic 340 provides the retrieved data on a result bus to bypass the data to the younger, dependent instructions and to write the retrieved data into the destination physical register. In some embodiments, logic allocates a queue entry in the load retirement queue 350. The logic updates the queue entry with the translated physical address of the load instruction. For a cache miss, the processing pipeline logic 340, if the load instruction is a predicted load request, then the load request is dropped. A later non-predicted load request corresponding to the load instruction will be processed later with an address calculated from source operands, rather than with a predicted address retrieved from the prediction table 320. On a cache miss, the request is dropped and the load is treated like a non-predicted load. In other embodiments, the logic allocates a queue entry in the load retirement queue 350 despite the cache miss, marks the load request as no longer a predicted load request, and waits for the source operands to become ready. When the source operands are ready and arbitration logic selects the queue entry, the load request is sent to the pipeline processing logic 340 to have the target address calculated from the source operands.

In some embodiments, after translation by the TLB, the calculated address is compared to the predicted address despite the predicted load request being dropped. Logic marks the queue entry of the load retirement queue 350 based on whether the addresses match or not. In some embodiments, logic uses the match/mismatch result for later updating values stored in the learning table 380. In addition, the pipeline processing logic 340 accesses a store queue to determine whether the load instruction qualifies for store-to-load forwarding (STLF). If so, then the cache stores stale data for the load instruction. If the predicted load request was not dropped earlier, but either the calculated address did not match the predicted address or the load instruction qualifies for STLF, then the pipeline processing logic 340 initiates a flush of the pipeline due for the incorrect speculative execution. In an embodiment, the pipeline processing logic 340 flushes the load instruction and younger instructions and refetches them.

In some embodiments, the logic uses the load update queue 370 due to time constraints of the pipeline stages. In an embodiment, arbitration logic selects a queue entry of the load retirement queue 350, and stores a copy of some or all of its information in an allocated queue of the load update queue 370. When logic selects a queue entry of the load update queue 370, the logic performs a lookup of the learning table 380. If no table entry exists, logic allocates a table entry for the load instruction corresponding to the selected queue entry of queue 370. The logic uses one of a variety of mechanisms for selecting a table entry to evict if the learning table 380 is full. For example, the logic uses a least recently used (LRU) mechanism. In other embodiments, the logic uses an age, a priority or other value for determining which table entry to evict. When a table entry exists in table 380, logic updates one or more fields based on the processing of the load instruction.

In some embodiments, the load address predictor 300 uses a misprediciton filter for filtering which load instructions are candidates for allocating entries in the load update queue 370, and consequently table entries in the learning table 380 and the prediction table 320. In some embodiments, when a table entry is evicted from the learning table 380 with a level of confidence indication indicating a level of confidence below a lower threshold, the corresponding load instruction is inserted in the misprediction filter 360. In one embodiment, the misprediction filter is a bloom filter storing identification information of qualified load instructions such as a portion or all of the program counter, a hash value, or other.

It is noted that each of the queues 310, 330, 350 and 370 in addition to the tables 320 and 380 are designed as one of a variety of data storage structures. Examples are a set of register or flip-flops, a content addressable memory (CAM), one of a variety of random access memories (RAMs) with a variation of a standard six-transistor (6T) cell, and so on. Any RAM structures use one of a fully associative organization, a set-associative organization or a direct-mapped organization. In some embodiments, one or more of the data structures use a split design, rather than a unified design. It is also noted that, in some embodiments, the logic of the load address predictor 300 is distributed throughout a processor core 100, rather than localized within the load address predictor 300. Similar to the logic of the processor core 100, the logic for the load address predictor 300 is implemented in hardware such as circuitry, in software, such as firmware, or a combination of hardware and software.

Figure 4:
FIG. 4 is a block diagram of one embodiment of a table entries of a prediction table and a learning table for load address prediction.

Referring to FIG. 4, a block diagram illustrating one embodiment of prediction table entries 400 is shown. In some embodiments, the load prediction table entry 410 is representative of table entries in a load prediction table such as load prediction table 320 (of FIG. 3). Similarly, in some embodiments, the load prediction learning table entry 430 is representative of table entries in a load prediction table such as load prediction learning table 380 (of FIG. 3). In various embodiments, the load prediction table entry 410 includes fields 412-424. In various embodiments, the load prediction learning table entry 430 includes fields 432-448. Although the fields 412-424 and the fields 432-448 are shown as contiguous fields organized in a particular order, in other embodiments, any other order is used and one or more fields are not placed in a contiguous manner. In addition, in yet other embodiments, one or more additional fields are used by the entries 410 and 430, and one or more fields of fields 412-424 and the fields 432-448 are not included in entries 410 and 430.

The status field 412 of the load prediction table entry 410 (or table entry 410) includes one or more of a valid bit, an age, a priority level, and so forth. The instruction program counter tag 414 includes a portion of the program counter used to identify the corresponding load instruction. In some embodiments, a hash value derived from the program counter is also stored in the table entry 410. The security tag 416 includes one or more of an application specific identifier (ASID, an exception level, an indication of a guarded mode, a virtual machine identifier (VMID), and so forth. In various embodiments, the fields 412, 414 and 416 are used during lookups of the prediction table to determine whether a hit occurs.

The field 418 stores the predicted address and the field 420 stores the predicted stride. The field 422 stores an indication specifying whether the load instruction is a strided load instruction. If so, in some embodiments, the field 418 stores a base address and the field 420 stores the next predicted stride based on the base address. In another embodiment, the field 418 stores the last predicted address and the field 420 stores the predicted stride based on the last predicted address.

In various embodiments, the table entry 410 also includes the field 424, which stores an indication specifying whether there is a non-zero number of intermittent strided load instructions with a same program counter (PC) between an oldest strided load instruction causing allocation of an entry in the load prediction table and a youngest strided load instruction accessing the load prediction table after the allocation. In other embodiments, table entry 410 includes two or more fields, rather than the single field 424, for storing identifying this indication. In one example, the processor currently includes four strided load instructions with a same PC in its multiple pipeline stages. The processor core 100 (of FIG. 1) illustrates an embodiment of the multiple pipeline stages. For example, a branch instruction resolves to be taken multiple times, so the instruction fetch unit refetches the same lines of code from the instruction cache. Therefore, it is possible that the processor core has multiple strided load instructions with a same PC in its multiple pipeline stages. In this example, the number of strided load instructions currently in the processor pipeline stages is four. Continuing with this example, the load store unit (LSU) resolves the address of the oldest strided load instruction and updates a corresponding entry of the load prediction learning table. Logic determines the level of confidence has reached a threshold, such as a count of 63, in one embodiment. In response, logic allocates an entry in the load prediction table with the predicted base address and the predicted stride. The youngest strided load instruction accesses the load prediction table. However, the predicted address is the sum of the base address and three times the stride, not one times the stride. The instance count is greater than one due to the other two strided load instructions currently in the pipeline stages between the oldest strided load instruction and the youngest strided load instruction.

A variety of methods are possible and contemplated for detecting a non-zero number of intermittent strided load instructions with a same PC between an oldest strided load instruction causing allocation of an entry in the load prediction table and a youngest strided load instruction accessing the load prediction table after the allocation. In the earlier example, the non-zero number of intermittent strided load instructions was two. In other words, logic in the processor implements a "catchup" process for determining the predicted address for an initial hit of an entry in the load prediction table for a strided load instruction. In some embodiments, depending on the implementation of the catch up process, the initial hit of the load prediction table occurs with the initial strided load instruction accessing the load prediction table after the allocation of the entry in the load prediction table. For example, using the earlier example of four strided loads with the same PC in the pipeline stages, the initial hit occurs for the fourth strided load instruction with the same PC in the processor pipeline stages. In other embodiments, the initial hit of the load prediction table occurs with a strided load instruction after the initial strided load instruction accessing the load prediction table. Using the earlier example, in such embodiments, the fifth, sixth or later strided load instruction with the same PC in the processor pipeline stages hits in the load prediction table.

After the catch up process completes for the initial hit in the load prediction table for a particular strided load instruction, logic determines the predicted address without considering a non-zero number of intermittent strided load instructions since the last access of the load prediction table. Logic updates one or more of the base address, the stride and any instance count stored in the load prediction table accordingly. Therefore, for subsequent hits in the load prediction table for the particular strided load instruction, logic correctly determines the predicted address. Using the earlier example, the instance count becomes one, rather than three. Alternatively, the base address or the stride is updated to indicate an effect of an instance count of one.

In one embodiment, when logic initially allocates an entry in the load prediction table for a strided load instruction, logic for the catchup process causes a miss in the load prediction table for the immediately next strided load instruction to with the same PC. However, the logic marks this strided load instruction as a probing strided load instruction. In an embodiment, logic stores an indication of this strided load instruction being a probing load in table entry 410. Therefore, for any subsequent strided load instructions accessing the same table entry 410 while the indication of a probing load is stored, logic updates one or more of the base address, the stride and the instance count to indicate a number of strided load instructions after the probing strided load instruction with the same PC accessing the load prediction table. In addition, logic maintains the PC in a separate table, queue or other data storage. When the LSU resolves addresses for any intermittent strided load instructions, logic updates one or more of the base address, the stride and the instance count stored in the separate data storage based on the resolved addresses. Later, when the LSU resolves the address for the probing strided load instruction, logic updates one or more of the base address, the stride and the instance count stored in the separate data storage based on the resolved address of the probing strided load instruction. Afterward, logic updates current values of one or more of the base address, the stride and the instance count in the table entry 410 based on the updated values in the separate data storage. Following, logic updates field 424 to indicate that there are no more intermittent strided load instructions. Now, subsequent strided load instructions with the same PC accessing the load prediction table will hit on table entry 410 and receive a predicted address.

In another embodiment, logic for the catchup process in the processor maintains a count of load instructions with a same PC currently in the pipeline stages, but invalidates the count when logic later determines a load instruction is a non-strided load instruction. Therefore, when logic initially allocates an entry in the load prediction table for a strided load instruction, the instance count is known by performing a lookup based on the PC of a separate table or queue storing the counts of strided load instruction with a same PC currently in the pipeline stages. Logic can store the instance count in the recently allocated table entry 410 and store an indication that the instance count should be used.

Once a strided load instruction hits on the entry, logic determines the predicted address is the sum of the stored base address and the stored predicted stride times the stored instance count. In the example, the instance count is three, or one less than the total number of four, since the oldest strided load instruction was considered during allocation of the load prediction table. Afterward, logic updates one or more of the base address, the stride and the instance count to indicate that logic determines subsequent predicted addresses without considering a non-zero number of intermittent strided load instructions since the last access of the load prediction table. A variety of other methods are possible and contemplated for detecting a non-zero number of intermittent strided load instructions with a same PC between an oldest strided load instruction causing allocation of an entry in the load prediction table and a youngest strided load instruction accessing the load prediction table after the allocation.

Regarding the load prediction learning table entry 430 (or table 430), the fields 432, 434, 436, 438, 440 and 442 store information similar to the information stored in fields 412-422 described earlier. In various embodiments, the field 444 stores a level of confidence indication specifying a level of confidence that the predicted address stored in field 438 is correct for the corresponding load instruction identified by at least the instruction program counter tag stored in field 434. In various embodiments, the level of confidence indication stored in field 444 is a count. In other embodiments, this level of confidence indication is a mapped value or any other value used to specify a level of confidence that the predicted address is correct for a corresponding load instruction.

When the level of confidence indication is a count, in an embodiment, the higher the count, the higher the level of confidence that the predicted address is correct for the corresponding load instruction. In such embodiments, logic increments the count stored in field 444 when the predicted address stored in field 438 matches a calculated address for the load instruction. In one embodiment, when the count stored in field 444 exceeds an upper threshold, the information stored in the table entry 410 is stored in an allocated entry of the prediction table, so that the predicted load address of field 438 is available for use as a predicted address on a subsequent execution of the load instruction. The field 446 stores an indication of whether the corresponding load instruction has an allocated table entry in the prediction table. In another embodiment, logic allocates an entry of the prediction table when the count stored in field 444 meets a threshold. For example, in an embodiment, the level of confidence is measured by a saturating counter. When the count reaches a maximum count, such as 63 for a 6-bit counter, the count is no longer incremented despite subsequent correct predictions. In one embodiment, the maximum count of 63 is used as the threshold, and logic determines the count meets the threshold when the count equals the maximum count. In another embodiment, the count value of 62 is used as the threshold, and logic determines the count meets the threshold when the count surpasses the threshold.

When the level of confidence indication is a count, in another embodiment, the lower the count, the higher the level of confidence that the predicted address is correct for the corresponding load instruction. In such embodiments, logic decrements the count stored in field 444 when the predicted address stored in field 438 matches a calculated address for the load instruction. The field 448 stores a count of consecutive address mispredictions. When the count stored in the field 448 exceeds a threshold, in some embodiments, table entries in each of the prediction table and the learning table are invalidated for the corresponding load instruction.

Figure 5:
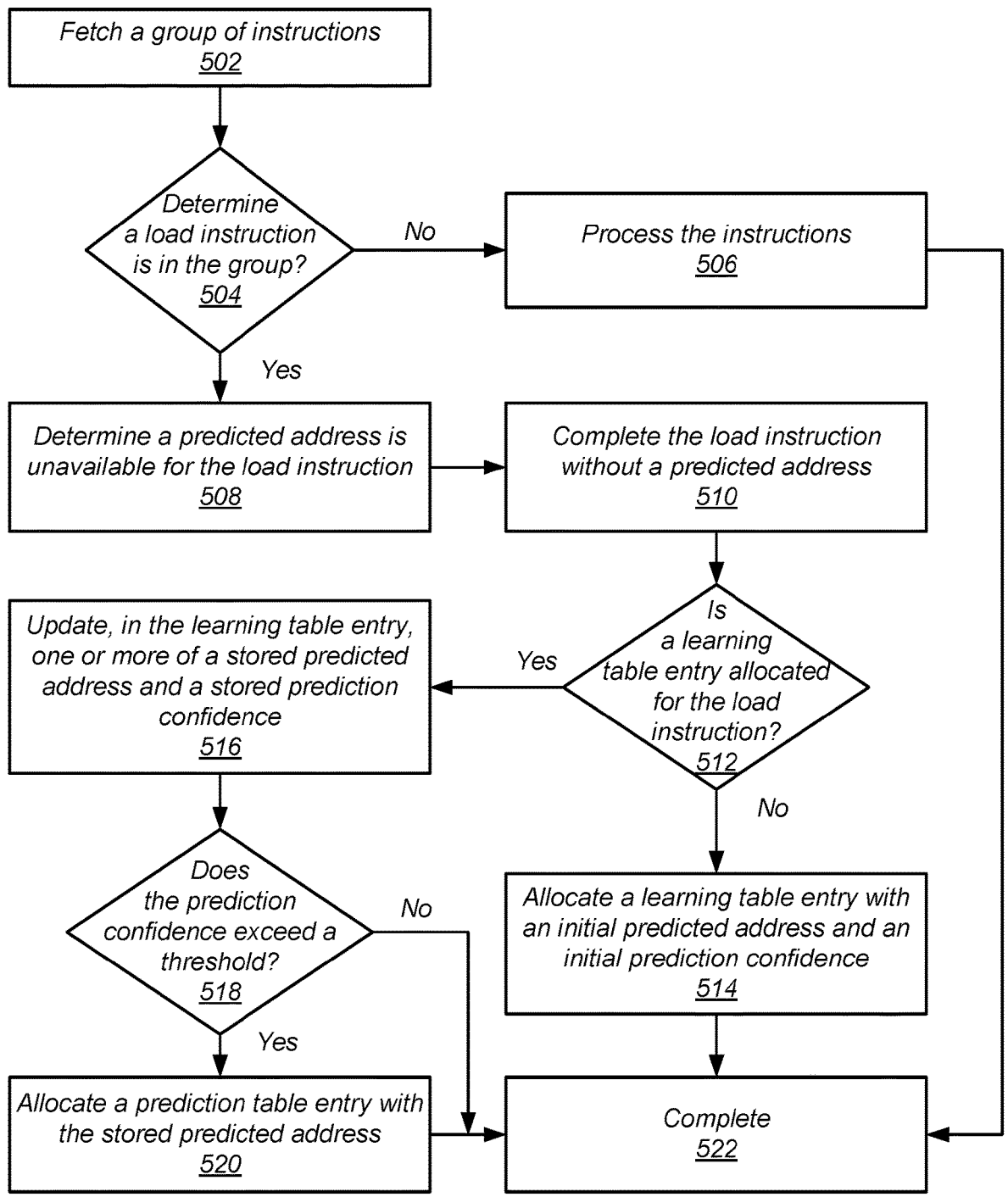
FIG. 5 is a flow diagram of one embodiment of a method for efficiently reducing the latency of load operations.

Turning now to FIG. 5, a generalized flow diagram of one embodiment of a method 500 for efficiently reducing the latency of load operations is shown. Logic of a processor, such as logic in an instruction fetch unit, fetches a group of instructions (block 502). The logic determines whether a load instruction is in the group of fetched instructions. In some embodiments, the determination occurs during a decode pipeline stage. In other embodiments, the logic accesses, for each instruction, a load address prediction table with a program counter or a hash value generated from the program counter. If the logic determines a load instruction is not within the group ("no" branch of the conditional block 504), then the logic processes the instructions (block 506). For example, the logic performs decoding, dependency checking, register renaming, execution and commitment for the group of instructions. Afterward, method 500 completes (block 522).

If the logic determines a load instruction is within the group ("yes" branch of the conditional block 504), then the logic processes the load instruction. The logic determines a predicted address is not available for the load instruction (block 508). When the logic determines a predicted address is available for the load instruction, the logic, in some embodiments, performs the steps 210-222 of method 200 described earlier. Here, method 500 performs the steps of the earlier block 208 of method 200 (of FIG. 2). After determining that there is no available predicted address for the load instruction, the logic completes the load instruction without a predicted address (block 510). For example, the logic performs dependency checks, register renaming, obtains the source operands for the load instruction, and calculates a target address for the load instruction. The logic accesses a cache with the target address if the logic does not perform store-to-load forwarding (STLF).

If the logic performs store-to-load forwarding based on a program counter, a hash value, or other, in various embodiments, the logic verifies the bypassing of the store data before accessing a load prediction learning table (or learning table). If the logic determines a misprediction occurred with store-to-load forwarding, then the logic updates any STLF predictor, and flushes the pipeline of the load instruction and younger instructions. If the logic determines no misprediction has occurred, then the logic accesses the learning table for the load instruction. If the logic determines that there is no learning table entry for the load instruction ("no" branch of the conditional block 512), then the logic allocates a learning table entry with an initial predicted address and an initial prediction confidence (block 514). For example, in an embodiment, the initial predicted address is the calculated address for the load instruction. In one embodiment, the initial prediction confidence is a reset value such as zero. In another embodiment, the initial prediction confidence is a midrange value or one of any other available values for the prediction confidence. Afterward, method 500 completes (block 522).

If the logic determines that there is an entry in the learning table for the load instruction ("yes" branch of the conditional block 512), then the logic updates one or more of a predicted address and a prediction confidence (block 516) in the entry. If the stored predicted address matches the address that was calculated for the load instruction, then the logic updates the stored prediction confidence to increase the level of confidence in the corresponding predicted address. If the stored predicted address does not match the calculated address, then the logic updates the stored prediction confidence to decrease the level of confidence in the corresponding predicted address. In addition, in some embodiments, the logic replaces the stored predicted address with the calculated address.

If the updated prediction confidence does not exceed a threshold ("no" branch of the conditional block 518), then method 500 completes (block 522). However, if the updated prediction confidence meets (e.g., equals or exceeds) a threshold ("yes" branch of the conditional block 518), then the predicted address is conveyed for allocation in a separate load instruction prediction table (block 520) where it will be available for use in predicting load addresses. In some embodiments, the table entry of the learning table stores an indication specifying whether a table entry in the prediction table is already allocated. Afterward, method 500 completes (block 522).

Figure 6:
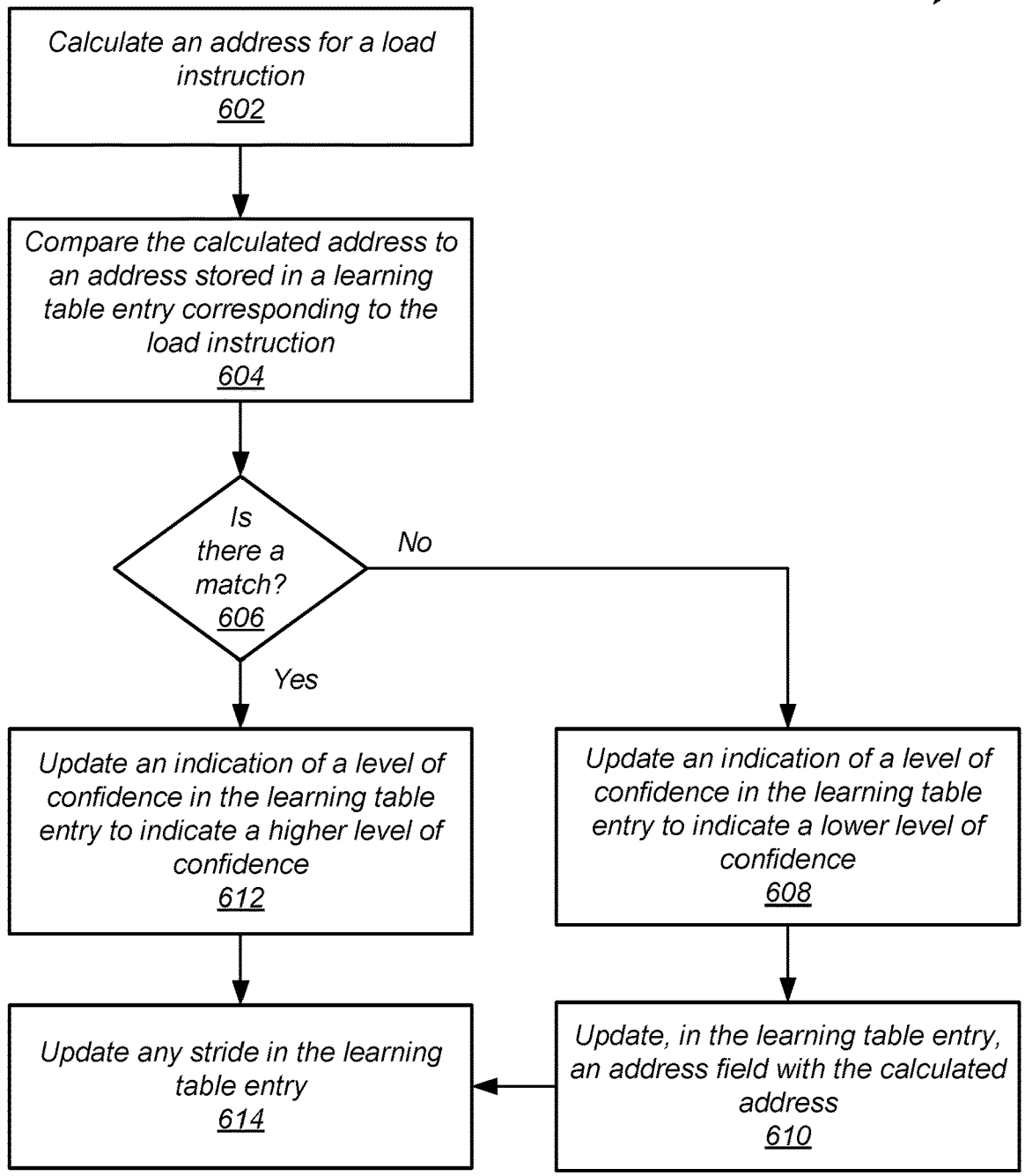
FIG. 6 is a flow diagram of one embodiment of a method for efficiently reducing the latency of load operations.

Turning now to FIG. 6, a generalized flow diagram of one embodiment of a method 600 for efficiently reducing the latency of load operations is shown. Logic of a processor calculates an address for a load instruction (block 602). For example, the logic obtains values for the source operands of the load instruction and sums the values. The logic compares the calculated address to an address stored in a learning table entry that corresponds to the load instruction (block 604). In some embodiments, the learning table entry stores an indication that the load instruction is a strided load instruction. In such cases, the logic sums a base address with a predicted stride, each stored in the learning table entry, and compares the sum with the received calculated address.

If the logic determines that there is a mismatch ("no" branch of the conditional block 606), then the logic updates a level of confidence indication in the learning table entry to indicate a lower level of confidence that the address stored in the learning table entry is correct for a corresponding load instruction (block 608). In some embodiments, this level of confidence indication is a count. In an embodiment, the logic decrements this count by a particular amount. In such cases, a higher count indicates a higher level of confidence. In other embodiments, when a lower count indicates a higher level of confidence, the logic increments the count by a particular amount. In other embodiments, the logic updates the count to a particular value regardless of the current value of the count. For example, the logic updates the count to a reset value, a midrange value, another mapped value, or other. In some embodiments, the logic updates, in the learning table entry, an address field with the calculated address (block 610). If the learning table entry stores an indication that the load instruction is a strided load instruction, then, in some embodiments, the logic resets the stride value. In other embodiments, the logic resets the indication to specify that the load instruction is not a strided load instruction.

After comparing the calculated address with the predicted address stored in the learning table entry, if the logic determines that there is a match ("yes" branch of the conditional block 606), then the logic updates the level of confidence indication in the learning table entry to indicate a higher level of confidence (block 612). When the level of confidence indication is a count, in an embodiment, the logic increments the count by a particular amount. In such cases, a higher count indicates a higher level of confidence. In other embodiments, when a lower count indicates a higher level of confidence, the logic decrements the count by a particular amount. In embodiments using a stride indication, the logic updates a stride in the learning table entry (block 614). If an indication stored in the learning table entry specifies that the load instruction is not a strided load instruction, then the logic takes no further steps. If the indication stored in the learning table entry specifies that the load instruction is a strided load instruction, then, in some embodiments, the logic updates base address with the calculated address and maintains the currently stored stride.

Figure 7:
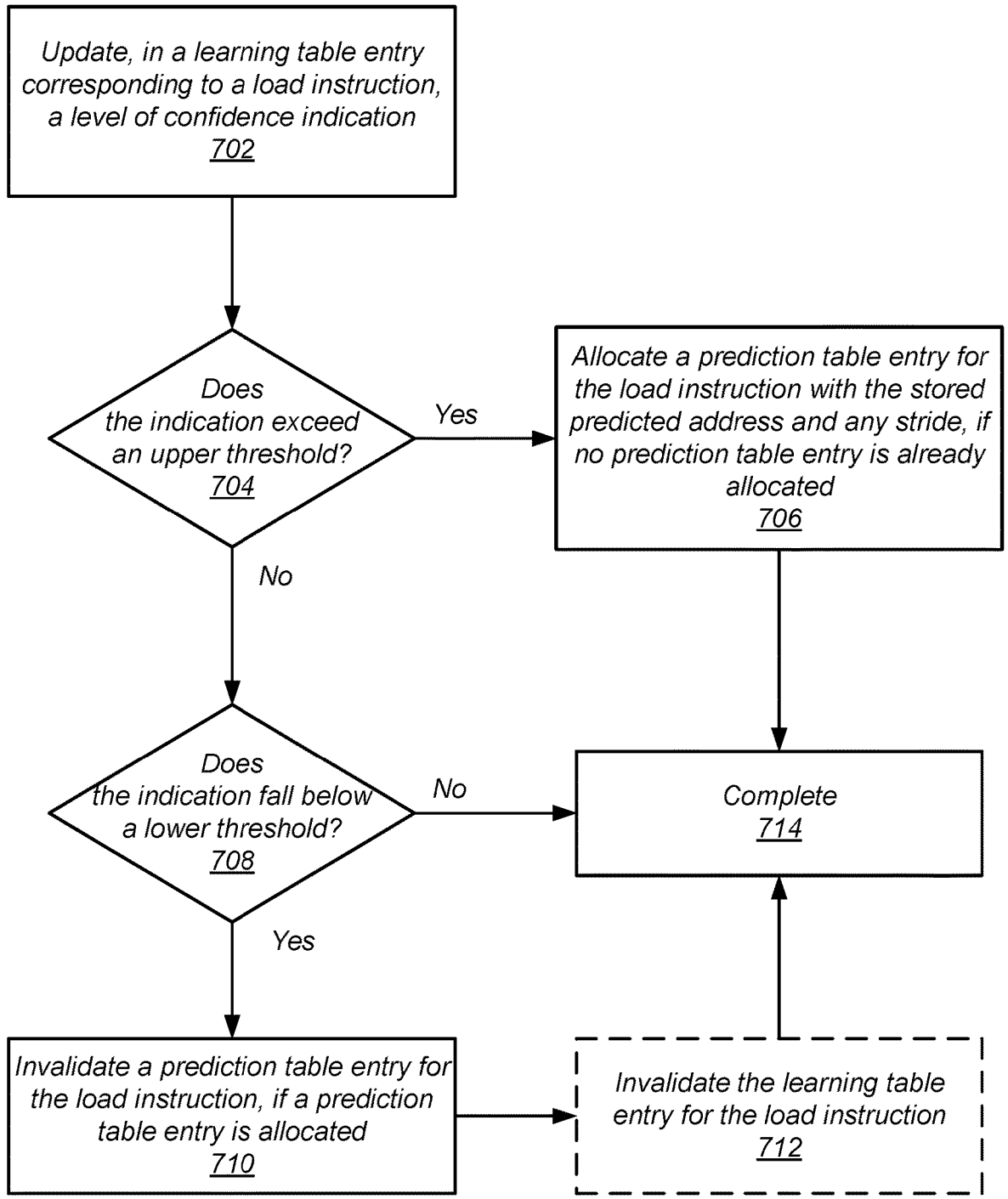
FIG. 7 is a flow diagram of one embodiment of a method for efficiently reducing the latency of load operations.

Turning now to FIG. 7, a generalized flow diagram of one embodiment of a method 700 for efficiently reducing the latency of load operations is shown. Logic of a processor updates a level of confidence indication for a load instruction (block 702). In various embodiments, the level of confidence indication specifies a level of confidence that the predicted address is correct for a corresponding load instruction. In some embodiments, a count is used as the level of confidence indication with a higher count indicating a higher level of confidence that the predicted address is correct for a corresponding load instruction. However, in other embodiments, a lower count may be used to indicate a higher level of confidence. Various such embodiments are possible and are contemplated. If the logic determines that the updated level of confidence indication meets (e.g., equals or surpasses) a threshold ("yes" branch of the conditional block 704), then the logic allocates a prediction table entry for the load instruction with the stored predicted address and any stride, if a prediction table entry for the load instruction does not already exist (block 706). As described earlier, in some embodiments the table entry of the learning table stores an indication specifying whether a table entry in the prediction table is already allocated. If so, then the allocation step of 706 need not be performed. Afterward, method 700 completes (block 714).

If the logic determines that the updated level of confidence indication does not meet (e.g., equal or surpass) an upper threshold ("no" branch of the conditional block 704), and the logic determines that the updated level of confidence indication does not fall below a lower threshold ("no" branch of the conditional block 708), then method 700 completes (block 714). However, if the logic determines that the updated level of confidence indication falls below a lower threshold ("yes" branch of the conditional block 708), then the logic invalidates a prediction table entry corresponding to the load instruction (if such a prediction table entry exists) (block 710). In various embodiments, the learning table entry stores an indication specifying whether a table entry corresponding to the load instruction currently exists.

In addition, if the level of confidence indication falls below the threshold, the logic invalidates the learning table entry for the load instruction (block 712). In some embodiments, the logic invalidates the learning table entry only if a corresponding prediction table entry is first invalidated. In an embodiment, the learning table entry stores an indication that the corresponding prediction table entry was invalidated and continues to compare the level of confidence indication to another threshold smaller than the lower threshold. When the level of confidence indication falls below this other threshold, the logic invalidates the learning table entry. In other embodiments, the logic maintains (i.e., does not invalidate) the learning table entry with the updated level of confidence indication unless the learning table entry is evicted. Logic evicts learning table entries when the learning table is full and needs to allocate a new entry. The logic bases eviction on one or more of a least recent used (LRU) value, a priority level, an age, the level of confidence indication, and so on. Afterward, method 700 completes (block 714).

Figure 8:
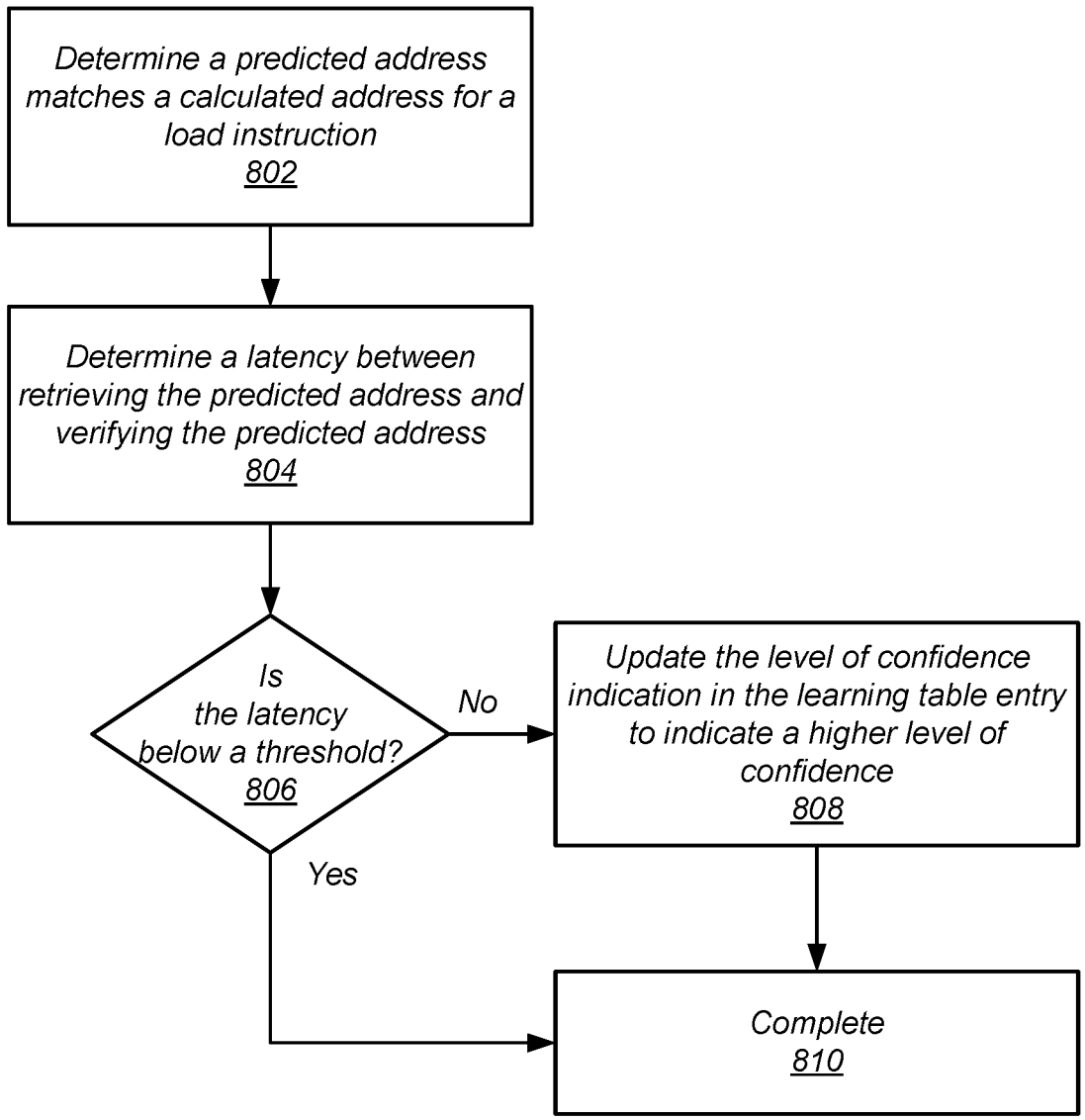
FIG. 8 is a flow diagram of one embodiment of a method for efficiently reducing the latency of load operations.

Turning now to FIG. 8, a generalized flow diagram of one embodiment of a method 800 for efficiently reducing the latency of load operations is shown. Logic of a processor determines a predicted address matches a calculated address for a load instruction (block 802). The logic determines a latency between retrieving the predicted address and verifying the predicted address (block 804). In some embodiments, the logic measures the latency as a number of clock cycles between two particular clock cycles with particular events occurring in them. For example, in one embodiment, the logic measures the latency between a first clock cycle when the logic retrieves the predicted address from a load instruction prediction table (or prediction table) and a second clock cycle when the logic compares the retrieved predicted address with the calculated address.

In other embodiments, the logic measures the latency as a number of clock cycles that the non-predicted load instruction, which is used for later verification, waits in a reservation station before being dispatched. In yet another embodiment, the logic measures the latency as a number of clock cycles between a first clock cycle and a second clock cycle. In the first clock cycle, data is stored in a destination register of the predicted load instruction based on the predicted address. Therefore, the predicted load instruction speculatively receives data in the first clock cycle. In the second clock cycle, the predicted address is verified against a calculated address corresponding to the non-predicted load instruction. Other measurements for the latency are possible and contemplated.

If the logic determines that the latency is below a threshold ("yes" branch of the conditional block 806), then method 800 completes (block 810). For example, the logic foregoes updating a level of confidence indication in a learning table entry that corresponds to the load instruction. In such cases, the number of clock cycles used for completing the predicted load address compared to the number of clock cycles used for completing the non-predicted load address is considered small. Therefore, in some embodiments, the logic determines that it is unnecessary to consume resources of the load prediction table and the load learning table for the load instruction. Accordingly, in some embodiments, table entries are invalidated immediately for the load instruction.

In other embodiments, the logic updates a count of a number of consecutive times that the latency is below the threshold. In an embodiment, the logic waits for this count to meet a threshold before invalidating table entries. If the logic determines that the latency is not below a threshold ("no" branch of the conditional block 806), then the logic updates the level of confidence indication in the learning table entry to indicate a higher level of confidence (block 808). Afterward, method 800 completes (block 810).

Figure 9:
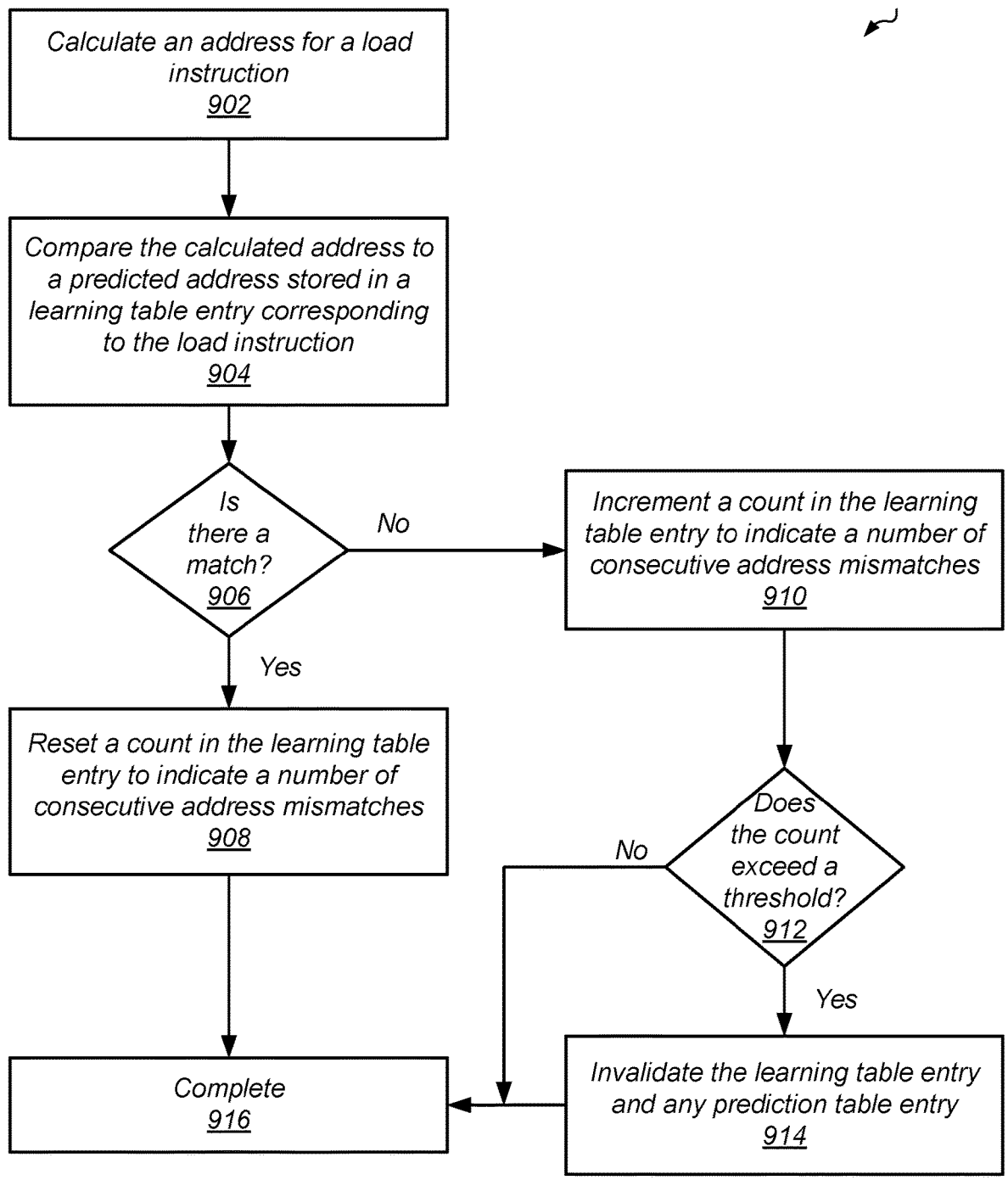
FIG. 9 is a flow diagram of one embodiment of a method for efficiently reducing the latency of load operations.

Referring to FIG. 9, a generalized flow diagram of one embodiment of a method 900 for reducing the latency of load operations is shown. Logic of a processor calculates an address for a load instruction (block 902). The logic compares the calculated address (optionally including any stride) to a predicted address stored in a learning table entry corresponding to the load instruction (block 904). In some embodiments, the logic sums a stored base address and a stored stride of the learning table entry and compares the sum with the calculated address. If the logic determines that there is a match ("yes" branch of the conditional block 906), then the logic resets a count in the learning table entry to indicate a number of consecutive address mismatches (block 908). In some embodiments, the reset value is zero. In other embodiments, another count value is selected for the reset value. Afterward, method 900 completes (block 916).

If the logic determines that there is a mismatch ("no" branch of the conditional block 906), then the logic increments a count in the learning table entry to indicate a number of consecutive address mismatches (block 910). If the logic determines that the count does not meet a threshold ("no" branch of the conditional block 912), then method 900 completes (block 916). If, on the other hand, the logic determines that the count meets the threshold ("yes" branch of the conditional block 912), then the logic invalidates the learning table entry and any corresponding prediction table entry (block 914).

Figure 10:
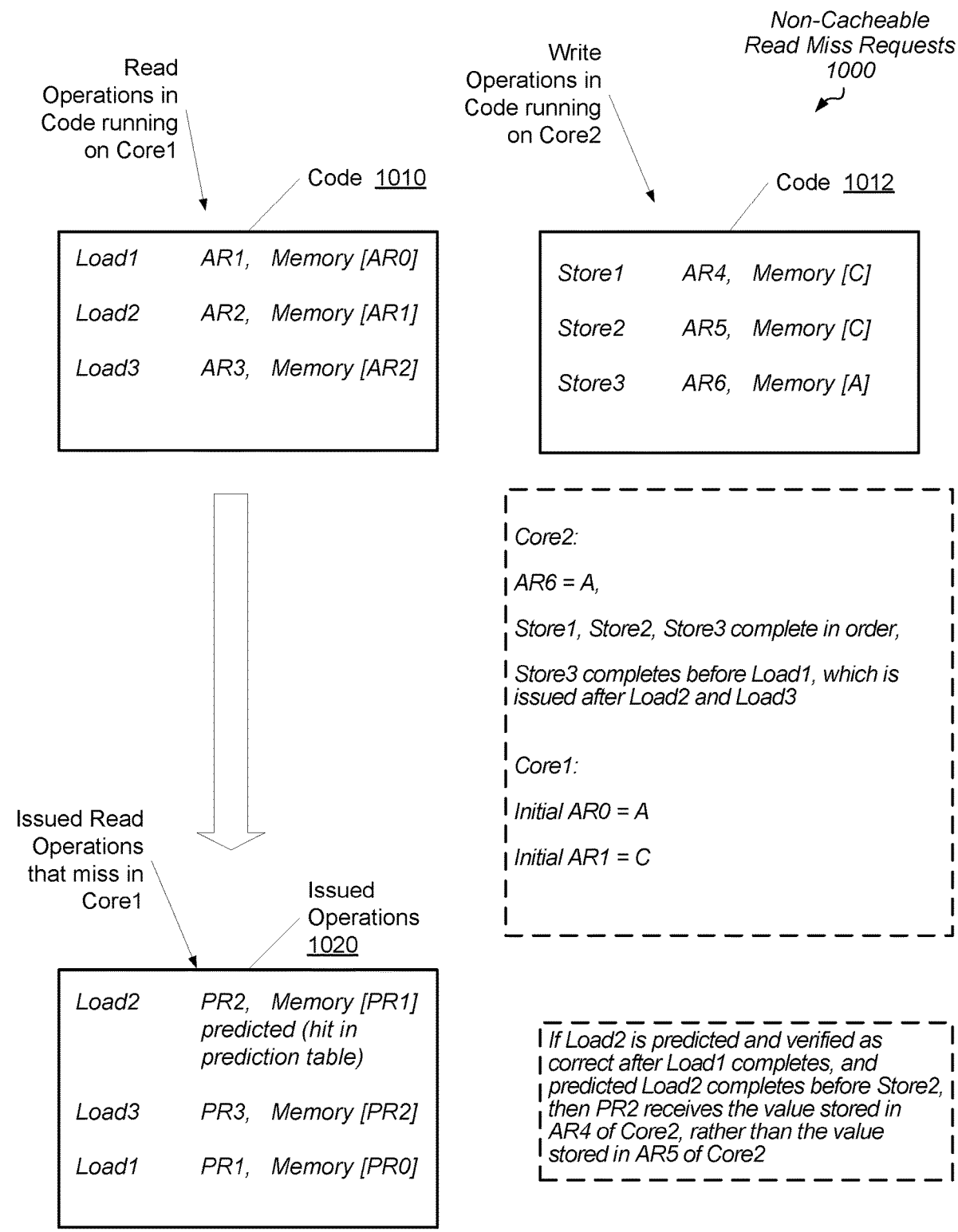
FIG. 10 is a block diagram of one embodiment of load requests in code.

Turning now to FIG. 10, a block diagram illustrating one embodiment of load requests in code 1000 is shown. In various embodiments, the code 1010 executing on a processor core 1 (or core1) includes three load requests "Load1" to "Load3" in program order. The code 1012 executes on a second processor 2 (or core2) includes three store requests "Store1" to "Store3" in program order. For each of the code 1010 and code 1012, the register identifiers for operands are denoted with "AR" for "architecture register," since register renaming has not yet occurred. In the code 1012, the first two store requests "Store1" and "Store2" target a same memory location indicated by "Memory[C]" where C generally denotes any address. The third store request targets a different memory location indicated by "Memory[A]" where A generally denotes an address different from the address specified by C. In the illustrated example, each of the three store requests "Store1" to "Store3" complete in program order. Additionally, the first store request "Store1" of code 1012 completes on core2 before the first load request "Load1" of code 1010 completes on core1.

In one example, the load request "Load2" hits in the load prediction table while the load requests "Load1" and "Load3" miss in the load prediction table. Accordingly, the load request "Load2" issues and completes before the load requests "Load1" and "Load3." The issued operations 1020 show the three load requests "Load1" to "Load3" on core1 in the order that they are issued after register renaming. The predicted load request "Load2" issues before the non-predicted load requests "Load1" and "Load3." The predicted load request "Load2" also issues before the non-predicted load request "Load2," which is not shown for ease of illustration. The store request "Store1" completes, but not the store request "Store2" when the predicted load request "Load2" completes. Therefore, the destination register of "Load2," which is physical register 2 or "PR2," receives a copy of the value stored in the source operand "AR4" in core2, rather than a copy of the value stored in the source operand "AR5."

At a later time, each of the non-predicted load request "Load1" and the non-predicted "Load2" completes. During the verification step, the logic determines that the prediction for the load request "Load2" was correct. However, the destination register "PR1" of the non-predicted load request "Load1" received a copy of the value stored in the source operand "AR6" in core2. To maintain memory ordering, the destination register "PR3" of the load request "Load2" should have received a copy of the value stored in the source operand "AR5" in core2, rather than a copy of the value stored in the source operand "AR4" in core2.

In order to avoid discrepancies in memory access ordering, in some embodiments the logic of the processor prevents a first load request from issuing ahead of an older load request upon which the first load request has a source operand dependency. This prevention may occur despite a hit in the prediction table for the first load request. In such cases, the non-predicted load request for the first load request may catch up to the predicted load request for the first load request. In an embodiment, the logic drops the predicted load request.

Figure 11:
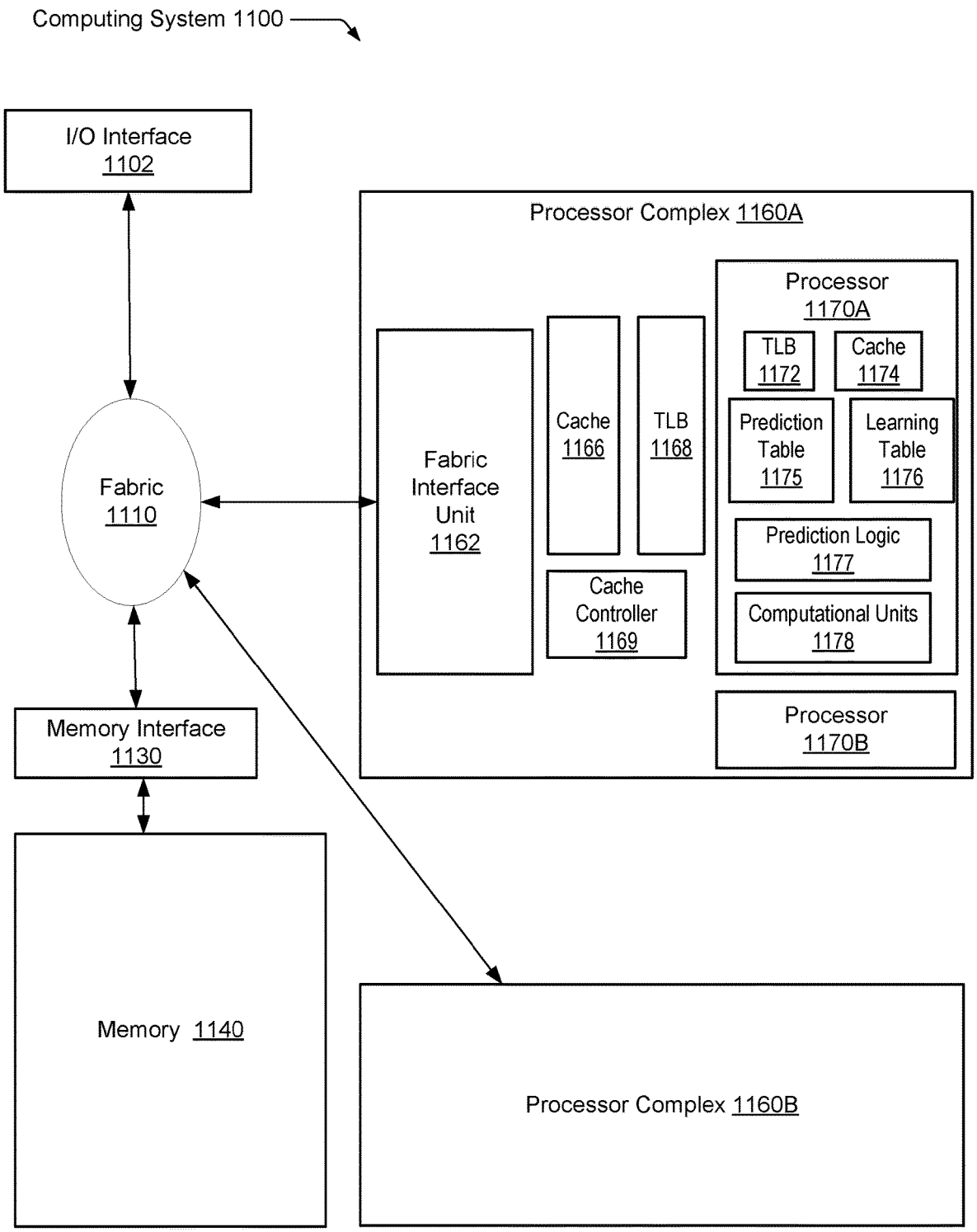
FIG. 11 is a block diagram of one embodiment of a computing system.

Referring to FIG. 11, a generalized block diagram of one embodiment of a computing system 1100 is shown. As shown, a communication fabric 1110 routes traffic between the input/output (I/O) interface 1102, the memory interface 1130, and the processor complexes 1160A-1160B. In various embodiments, the computing system 1100 is a system on chip (SoC) that includes multiple types of integrated circuits on a single semiconductor die, each integrated circuit providing a separate functionality. In other embodiments, the multiple functional units are individual dies within a package, such as a multi-chip module (MCM). In yet other embodiments, the multiple functional units are individual dies or chips on a printed circuit board.

Clock sources, such as phase lock loops (PLLs), interrupt controllers, power managers, and so forth are not shown in FIG. 11 for ease of illustration. It is also noted that the number of components of the computing system 1100 (and the number of subcomponents for those shown in FIG. 11, such as within each of the processor complexes 1160A-1160B) vary from embodiment to embodiment. The term "processor complex" is used to denote a configuration of one or more processor cores using local storage, such as a shared cache memory subsystem, and capable of processing a workload together.

In various embodiments, different types of traffic flows independently through the fabric 1110. The independent flow is accomplished by allowing a single physical fabric bus to include a number of overlaying virtual channels, or dedicated source and destination buffers, each carrying a different type of traffic. Each channel is independently flow controlled with no dependence between transactions in different channels. The fabric 1110 may also be packet-based, and may be hierarchical with bridges, cross bar, point-to-point, or other interconnects.

In some embodiments, the memory interface 1130 uses at least one memory controller and at least one cache for the off-chip memory, such as synchronous DRAM (SDRAM). The memory interface 1130 stores memory requests in request queues, uses any number of memory ports, and uses circuitry capable of interfacing to memory 1140 using one or more of a variety of protocols used to interface with memory channels used to interface to memory devices (not shown). In various embodiments, one or more of the memory interface 1130, an interrupt controller (not shown), and the fabric 1110 uses control logic to ensure coherence among the different processor complexes 1160A-1160B and peripheral devices.

Memory 1140 stores one or more applications. In an example, a copy of at least a portion of an application is loaded from memory 1140 into an instruction cache in one of the processors 1170A-1170B when the application is selected by a base operating system (OS) for execution. Alternatively, a virtual (guest) OS (not shown) selects the application for execution. Memory 1140 stores a copy of the base OS and copies of portions of the base OS are executed by one or more of the processors 1170A-1170B. Memory 1140 also stores source data for applications in addition to result data and intermediate data generated during the execution of applications.

A virtual address space for the data stored in memory 1140 and used by a software process is typically divided into pages of a prefixed size. The virtual pages are mapped to frames of physical memory. The mappings of virtual addresses to physical addresses where virtual pages are loaded in the physical memory are stored in page table 1150. Each of translation look-aside buffers (TLBs) 1168 and 1172 stores a subset of page table 1150.

In some embodiments, the components 1162-1178 of the processor complex 1160A are similar to the components in the processor complex 1160B. In other embodiments, the components in the processor complex 1160B are designed for lower power consumption, and therefore, include control logic and processing capability producing less performance. For example, supported clock frequencies may be less than supported clock frequencies in the processor complex 1160A. In addition, one or more of the processors in processor complex 1160B may include a smaller number of execution pipelines and/or functional blocks for processing relatively high power consuming instructions than what is supported by the processors 1170A-1170B in the processor complex 1160A.

As shown, processor complex 1160A uses a fabric interface unit (FIU) 1162 for providing memory access requests and responses to at least the processors 1170A-1170B. Processor complex 1160A also supports a cache memory subsystem, which includes at least cache 1166. In some embodiments, the cache 1166 is a shared off-die level two (L2) cache for the processors 1170A-1170B although an L3 cache is also possible and contemplated. In various embodiments, the processor complex 1160A does not actually include the off-die cache 1166 and the cache controller 1169 still supports servicing memory requests from the cache learning table 1176.

In some embodiments, the processors 1170A-1170B use a homogeneous architecture. For example, each of the processors 1170A-1170B is a general-purpose processor, such as a central processing unit (CPU), which utilizes circuitry for executing instructions according to a predefined general-purpose instruction set. Any of a variety of instruction set architectures (ISAs) is selected. In some embodiments, each core within processors 1170A-1170B supports the out-of-order execution of one or more threads of a software process and include a multi-stage pipeline. In other embodiments, one or more of the processors 1170A-1170B supports in-order execution of instructions. The processors 1170A-1170B may support the execution of a variety of operating systems.

In other embodiments, the processors 1170A-1170B use a heterogeneous architecture. In such embodiments, one or more of the processors 1170A-1170B is a highly parallel data architected processor, rather than a CPU. In some embodiments, these other processors of the processors 1170A-1170B use single instruction multiple data (SIMD) cores. Examples of SIMD cores are graphics processing units (GPUs), digital signal processing (DSP) cores, or otherwise.

In various embodiments, each one of the processors 1170A-1170B uses one or more cores and one or more levels of a cache memory subsystem. The processors 1170A-1170B use multiple one or more on-die levels (L1, L2, L3 and so forth) of caches for accessing data and instructions. If a requested block is not found in the on-die caches or in the off-die cache 1166, then a read request for the missing block is generated and transmitted to the cache controller 1169. The cache controller 1169 is capable of transmitted memory requests to the memory 1140 via the memory interface 1130 and fabric 1110. When an application is selected for execution by processor complex 1170A, a copy of the selected application is retrieved from memory 1140 and stored in cache 1174. In various embodiments, each of processor complexes 1160A-1160B utilizes linear addresses (virtual addresses) when retrieving instructions and data from caches 1174 and 1166 while processing applications.

In some embodiments, the computation units 1178 include units described earlier for the processor core 100 (of FIG. 1). Although shown externally, in some embodiments, the prediction table 1175, the learning table 1176 and the prediction logic 1177 are included among the computation units 1178. The tables 1175-1176 and the logic 1177 support load address prediction and verification. For example, in various embodiments, the tables 1175-1176 and the logic 1177 perform the functionality of the load address predictor 300 (of FIG. 3).

Figure 12:
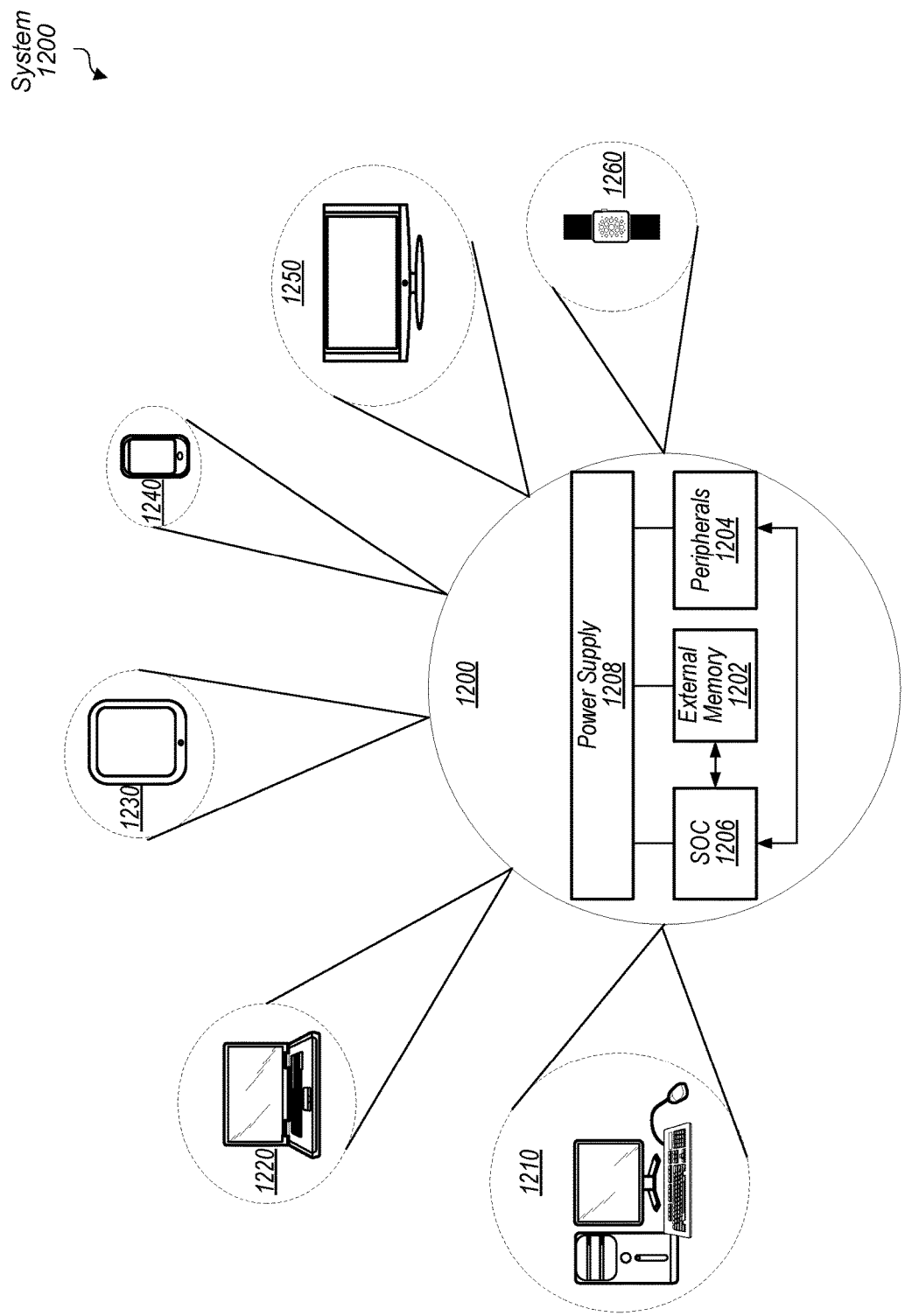
FIG. 12 is a block diagram of one embodiment of a system.

Turning next to FIG. 12, a block diagram of one embodiment of a system 1200 is shown. As shown, system 1200 represents chip, circuitry, components, etc., of a desktop computer 1210, laptop computer 1220, tablet computer 1230, cell or mobile phone 1240, television 1250 (or set top box coupled to a television), wrist watch or other wearable item 1260, or otherwise. Other devices are possible and are contemplated. In the illustrated embodiment, the system 1200 includes at least one instance of a system on chip (SoC) 1206 which includes multiple processors and a communication fabric. In some embodiments, SoC 1206 includes components similar to the load address predictor 300 (of FIG. 3) for efficiently reducing the latency of load operations. In various embodiments, SoC 1206 is coupled to external memory 1202, peripherals 1204, and power supply 1208.

A power supply 1208 is also provided which supplies the supply voltages to SoC 1206 as well as one or more supply voltages to the memory 1202 and/or the peripherals 1204. In various embodiments, power supply 1208 represents a battery (e.g., a rechargeable battery in a smart phone, laptop or tablet computer). In some embodiments, more than one instance of SoC 1206 is included (and more than one external memory 1202 is included as well).

The memory 1202 is any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices are coupled onto a circuit board to form memory modules such as single inline memory modules (SIMMs), dual inline memory modules (DIMMs), etc. Alternatively, the devices are mounted with a SoC or an integrated circuit in a chip-on-chip configuration, a package-on-package configuration, or a multi-chip module configuration.

The peripherals 1204 include any desired circuitry, depending on the type of system 1200. For example, in one embodiment, peripherals 1204 includes devices for various types of wireless communication, such as Wi-Fi, Bluetooth, cellular, global positioning system, etc. In some embodiments, the peripherals 1204 also include additional storage, including RAM storage, solid-state storage, or disk storage. The peripherals 1204 include user interface devices such as a display screen, including touch display screens or multi-touch display screens, keyboard or other input devices, microphones, speakers, etc.

In various embodiments, program instructions of a software application may be used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computer during use to provide the program instructions and accompanying data to the computer for program execution. In some embodiments, a synthesis tool reads the program instructions in order to produce a netlist including a list of gates from a synthesis library.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
a learning table comprising a plurality of entries, each configured to store at least a predicted address and a level of confidence indication specifying a level of confidence that the predicted address is correct; and
a data cache distinct from the learning table;
circuitry configured to:
identify an entry of the learning table, based on an identification of a load instruction;
select a predicted address stored in the entry of the learning table for use as a predicted address on a subsequent execution of the load instruction, based at least in part on a determination that the level of confidence indication stored in the entry of the learning table meets a threshold; and
based at least in part on an indication that the data cache stores stale data for the load instruction, update the level of confidence indication in the entry of the learning table to indicate a lower level of confidence than a currently indicated level of confidence.

2. The apparatus as recited in claim 1, wherein:
the circuitry is further configured to update the level of confidence indication stored in the entry of the learning table to indicate a lower level of confidence than the currently indicated level of confidence, based at least in part on a determination that a calculated address of the load instruction does not match the predicted address stored in the entry of the learning table; and
the calculated address of the load instruction is an address of a non-speculative instruction and the predicted address is an address of a speculative instruction.

3. The apparatus as recited in claim 1, wherein the apparatus further comprises a prediction table comprising a plurality of entries, wherein the circuitry is further configured to allocate an entry in the prediction table for the predicted address selected from the entry of the learning table.

4. The apparatus as recited in claim 3, wherein the circuitry is further configured to:
select the entry of the prediction table based on an identification of the load instruction on the subsequent execution;

use a predicted address in the entry of the prediction table for the load instruction on the subsequent execution; and based at least in part on a determination that the predicted address stored in the entry of the prediction table matches a calculated address for the load instruction on the subsequent execution, update level of confidence indication in the entry of the learning table to indicate a higher level of confidence.

5. The apparatus as recited in claim 4, wherein based at least in part on a determination that the predicted address stored in the prediction table does not match a calculated address corresponding to the load instruction on the subsequent execution, the circuitry is further configured to update the level of confidence indication in the entry of the learning table to indicate a lower level of confidence.

6. The apparatus as recited in claim 3, wherein:
based at least in part on a determination that the predicted address stored in the entry of the prediction table is found in a store queue in a load store unit, the circuitry is further configured to:
update the level of confidence indication in the entry of the learning table to indicate a lower level of confidence than a currently indicated level of confidence;
cancel a lookup of the data cache using the predicted address; and
cause the load instruction to retrieve data from the store queue.

7. The apparatus as recited in claim 1, wherein:
based at least in part on a determination that a calculated address of the load instruction matches the predicted address stored in the entry, the circuitry is further configured to update the level of confidence indication in the entry of the learning table to indicate a higher level of confidence than a currently indicated level of confidence; and
determining whether the predicted address matches a calculated address comprises adding a predicted stride to the predicted address before comparing the predicted address to the calculated address.

8. The apparatus as recited in claim 1, wherein the apparatus further comprises a prediction table comprising a plurality of entries, wherein:
based at least in part on a determination that the level of confidence indication stored in the entry of the learning table meets a threshold, the circuitry is further configured to allocate an entry in the prediction table for the predicted address in the entry of the learning table; and
based at least in part on a determination that the level of confidence indication stored in the entry of the learning table falls below a lower threshold, the circuitry is further configured to invalidate the entry of the prediction table.

9. The apparatus as recited in claim 8, wherein the circuitry is further configured to:
determine a latency between a first clock cycle when the predicted address is retrieved from the prediction table and a second clock cycle when the predicted address is verified with a calculated address of the load instruction; and
prevent updating of the level of confidence indication in the entry of the learning table, responsive to determining the latency is below a threshold.

10. A method, comprising:
storing, by circuitry, in each entry of a first plurality of entries of a learning table, a predicted address and a level of confidence indication specifying a level of confidence that the predicted address is correct;
storing data by a data cache, wherein the data cache is distinct from the learning table;
identifying, by the circuitry, an entry of the plurality of entries based on an identification of a load instruction;
selecting, by the circuitry, a predicted address stored in the entry of the learning table for use as a predicted address on a subsequent execution of the load instruction, in response to determining the level of confidence indication stored in the entry of the learning table meets a threshold; and
based at least in part on an indication that the data cache stores stale data for the load instruction, update the level of confidence indication in the entry of the learning table to indicate a lower level of confidence than a currently indicated level of confidence.

11. The method as recited in claim 10, wherein:
the method further comprises updating the level of confidence indication stored in the entry to indicate a lower level of confidence responsive to determining a calculated address of the load instruction does not match the predicted address stored in the entry of the learning table; and
the calculated address of the load instruction is an address of a non-speculative instruction and the predicted address is an address of a speculative instruction.

12. The method as recited in claim 10, wherein the method further comprises allocating, in an entry of a plurality of entries of a prediction table, the predicted address selected from the entry of the learning table.

13. The method as recited in claim 12, further comprising:
selecting the entry of the prediction table based on an identification of the load instruction on the subsequent execution;
use a predicted address in the entry of the prediction table for the load instruction on the subsequent execution; and
in response to determining the predicted address stored in the entry of the prediction table matches a calculated address for the load instruction on the subsequent execution, updating the level of confidence indication in the entry of the learning table to indicate a higher level of confidence.

14. The method as recited in claim 13, wherein in response to determining the predicted address stored in the prediction table does not match a calculated address corresponding to the load instruction, the method further comprises updating the level of confidence indication in the entry of the learning table to indicate a lower level of confidence.

15. The method as recited in claim 12, wherein in response to determining the predicted address stored in the entry of the prediction table is found in a store queue in a load store unit, the method further comprises:
updating the level of confidence indication in the entry of the learning table to indicate a lower level of confidence than a currently indicated level of confidence;
cancelling a lookup of the data cache using the predicted address; and
causing the load instruction to retrieve data from the store queue.

16. A non-transitory computer readable storage medium storing program instructions, wherein the program instructions are executable by a processor to:
store in each entry of a plurality of entries of a learning table, a predicted address and a level of confidence indication specifying a level of confidence that the predicted address is correct;

store data in a data cache, wherein the data cache is distinct from the learning table;

identify an entry of the plurality of entries based on an identification of a load instruction;

select a predicted address stored in the entry of the learning table for use as a predicted address on a subsequent execution of the load instruction, in response to determining the level of confidence indication stored in the entry of the learning table meets a threshold; and based at least in part on an indication that the data cache stores stale data for the load instruction, update the level of confidence indication in the entry of the learning table to indicate a lower level of confidence than a currently indicated level of confidence.

17. The non-transitory computer readable storage medium as recited in claim 16, wherein:

the program instructions are executable by a processor to update the level of confidence indication stored in the entry to indicate a lower level of confidence than the currently indicated level of confidence, responsive to determining a calculated address of the load instruction does not match the predicted address stored in the entry of the learning table; and the calculated address of the load instruction is an address of a non-speculative instruction and the predicted address is an address of a speculative instruction.

18. The non-transitory computer readable storage medium as recited in claim 16, wherein the program instructions are executable by a processor to allocate, in an entry of a plurality of entries of a prediction table, the predicted address selected from the entry of the learning table.

19. The non-transitory computer readable storage medium as recited in claim 18, wherein the program instructions are executable by a processor to:

select the entry of the prediction table based on an identification of the load instruction on the subsequent execution;

use a predicted address in the entry of the prediction table for the load instruction on the subsequent execution; and in response to determining the predicted address stored in the entry of the prediction table matches a calculated address for the load instruction on the subsequent execution, update the level of confidence indication in the entry of the learning table to indicate a higher level of confidence.

20. The non-transitory computer readable storage medium as recited in claim 18, wherein in response to determining the predicted address stored in the entry of the prediction table is found in a store queue in a load store unit, the program instructions are executable by a processor to:

update the level of confidence indication in the entry of the learning table to indicate a lower level of confidence than a currently indicated level of confidence;

cancel a lookup of the data cache using the predicted address; and cause the load instruction to retrieve data from the store queue.

* * * * *